(12) United States Patent
Yoshinaga et al.

(10) Patent No.: US 8,488,422 B2
(45) Date of Patent: Jul. 16, 2013

(54) ELASTIC MEMBER, MOUNTING STRUCTURE OF OPTICAL ELEMENT, AND PICKUP APPARATUS HAVING THE SAME

(75) Inventors: Chikashi Yoshinaga, Ota (JP); Nobuyuki Nakasawa, Oizumi-Machi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 13/435,619

(22) Filed: Mar. 30, 2012

(65) Prior Publication Data
US 2012/0250487 A1    Oct. 4, 2012

Related U.S. Application Data

(63) Continuation of application No. PCT/JP2010/067155, filed on Sep. 30, 2010.

(30) Foreign Application Priority Data

Sep. 30, 2009    (JP) .................................. 2009-227797

(51) Int. Cl.
*G11B 7/00*    (2006.01)

(52) U.S. Cl.
USPC .................. 369/44.15; 369/44.14; 369/112.03

(58) Field of Classification Search
None
See application file for complete search history.

(56) References Cited

U.S. PATENT DOCUMENTS 7,116,608 B2 * 10/2006 Jun et al. .................... 369/44.15

FOREIGN PATENT DOCUMENTS

| JP | 63-6523 | U | 1/1988 |
| JP | 2-76320 | U | 6/1990 |
| JP | 5-135382 | A | 6/1993 |

* cited by examiner

*Primary Examiner* — Muhammad N Edun
(74) *Attorney, Agent, or Firm* — Cantor Colburn LLP

(57) ABSTRACT

A mounting structure of an optical element, includes: an optical element; an elastic member usable when the optical element is mounted; and a holding unit configured to be mounted with the optical element and the elastic member, the elastic member configured to be pressed into the holding unit, the holding unit configured to be mounted with the optical element by use of the elastic member.

9 Claims, 17 Drawing Sheets

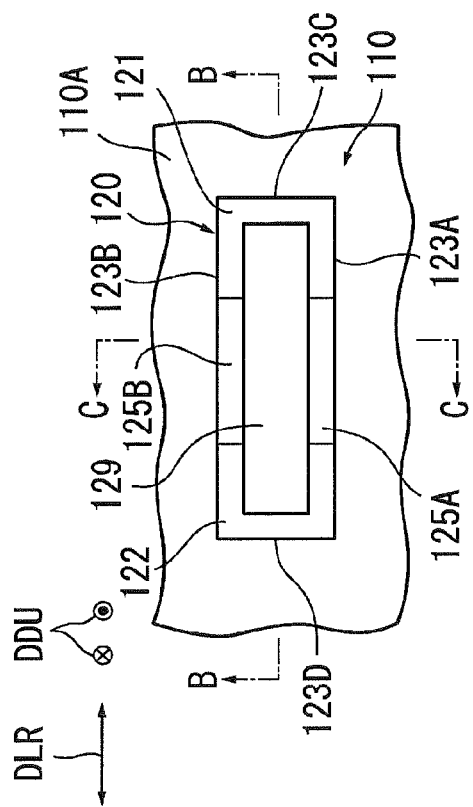
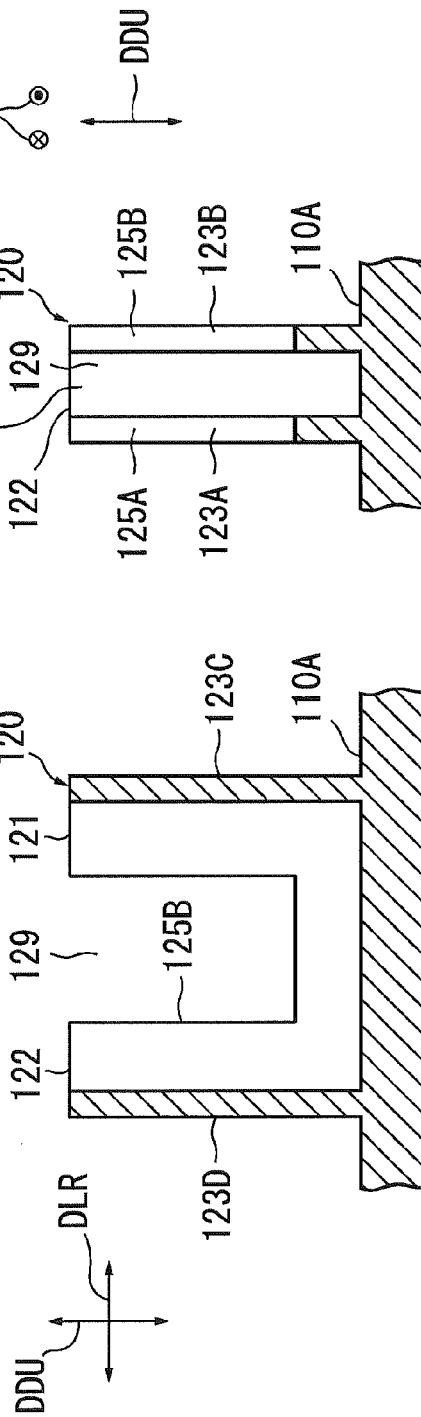
FIG. 5A
FIG. 5B
FIG. 5C

ELASTIC MEMBER, MOUNTING STRUCTURE OF OPTICAL ELEMENT, AND PICKUP APPARATUS HAVING THE SAME

CROSS-REFERENCE TO RELATED APPLICATIONS

This is a continuation application of International Patent Application No. PCT/JP2010/067155 filed Sep. 30, 2010, which claims the benefit of priority to Japanese Patent Application No. 2009-227797 filed Sep. 30, 2009. The full contents of the International Patent Application are incorporated herein by reference.

BACKGROUND OF THE INVENTION

1. Field of the Invention

The present invention relates to an elastic member, a mounting structure of an optical element, and a pickup apparatus having the same.

2. Description of the Related Art

Data in a disc is read using a pickup apparatus of a disc apparatus. Data is recorded in a disc using the disc apparatus. The disc can be a "CD (Compact Disc)" (trademark) or a "DVD (Digital Versatile Disc)" (registered trademark), for example.

Apparatuses relating to an optical disc apparatus and an optical pickup apparatus include an optical information recording and reproducing apparatus capable of acquiring a tracking method, by which mounting adjustment is facilitated and problems in a three-beam method can be solved, and also capable of high speed transfer by magnetic-field-modulation overwriting and high capacity based on super-resolution, for example (see, e.g., Japanese Laid-Open Patent Publication No. 5-135382 (pp. 1 and 3, and FIGS. 1 to 6)).

However, the optical pickup apparatus has such a problem that, when misalignment of a diffraction element such as a diffraction grating occurs, for example, it is hard to achieve desired performance of the optical pickup apparatus.

SUMMARY OF THE INVENTION

A mounting structure of an optical element according to an aspect of the present invention, includes: an optical element; an elastic member usable when the optical element is mounted; and a holding unit configured to be mounted with the optical element and the elastic member, the elastic member configured to be pressed into the holding unit, the holding unit configured to be mounted with the optical element by use of the elastic member.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 5A is a plan view of a holding unit configuring a mounting structure of an optical element according to a first embodiment of the present invention;

FIG. 5B is a cross-sectional view taken along line B-B of FIG. 5A;

FIG. 5C is a cross-sectional view taken along line C-C of FIG. 5A;

DETAILED DESCRIPTION OF THE INVENTION

Figure 1A:
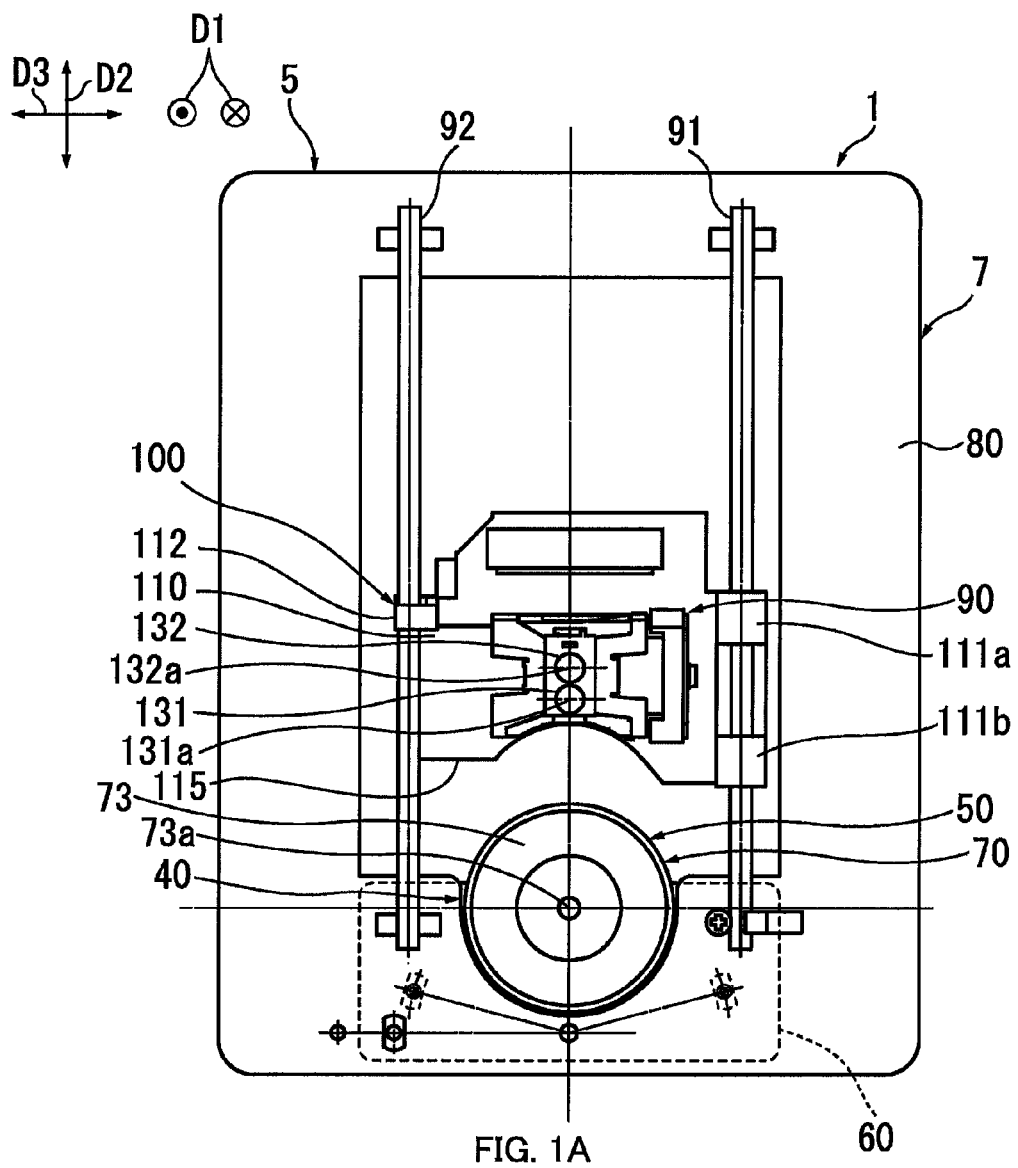
FIG. 1A is a plan view illustrating a pickup apparatus and a disc apparatus including the pickup apparatus according to a first embodiment of the present invention.

At least the following details will become apparent from descriptions of this specification and of the accompanying drawings.

First Example

A first embodiment of an elastic member, a mounting structure (attachment structure) of an optical element, and a pickup apparatus having the same according to an embodiment of the present invention will hereinafter be described in detail with reference to accompanying drawings.

A head main unit assembly 7 configuring a driving unit assembly 5 includes: a base portion 80 in a substantially plate-like shape; a pair of supports 91 and 92 in a long round bar-like shape that are attached to the base portion 80 in a substantially plate-like shape; and a head driving unit 90 movably mounted on the pair of supports 91 and 92 in a long round bar-like shape. The optical head driving unit 90 includes a pair of optical members 131 and 132 with which a signal-surface portion Ma of a disc M that is one of media M is irradiated with a light beam such as a laser light beam in a state where the light beam is focused on the signal-surface portion Ma. The "base portion" in this specification indicates a foundation or a bed, such as one in a substantially plate-like shape or a substantially base-like shape, for example, and is used as a designation for convenience. The "media" means a disc, etc., having data, information, a signal, etc., are stored therein, for example.

A motor main unit assembly 50 configuring the driving unit assembly 5 includes: a base 60 in a substantially flat plate-like shape having a circuit (not depicted) configured thereon; and a motor driving unit 70 attached in an electrically conductive manner to the base 60 in a substantially plate-like shape. The motor driving unit 70 includes: a small electric motor 71 configured to generate a rotary driving force, a rotary shaft 72 included in the small electric motor 71, and a rotary holding unit 73 mounted on the rotary shaft 72 and on which the disc M is to be mounted.

As the driving unit assembly 5 and the disc apparatus 1 including the assembly 5, the traverse mechanism 5 and an optical disc apparatus 1 including the mechanism 5 are used, for example.

Figure 1B:
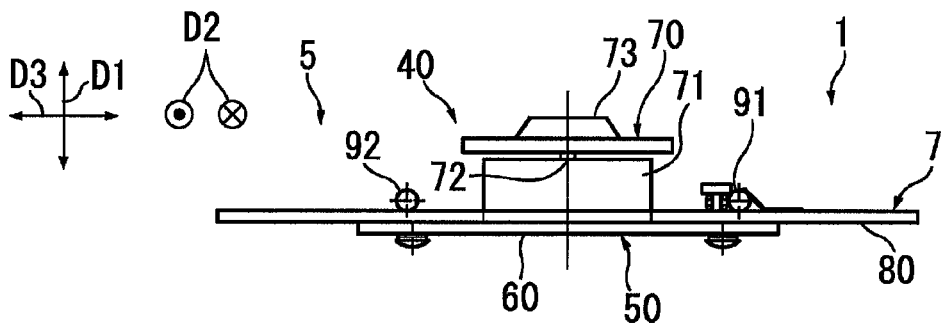
FIG. 1B is a schematic view illustrating a pickup apparatus and a disc apparatus including the pickup apparatus according to a first embodiment of the present invention when viewed from the side from a motor main unit assembly side.
Figure 2:
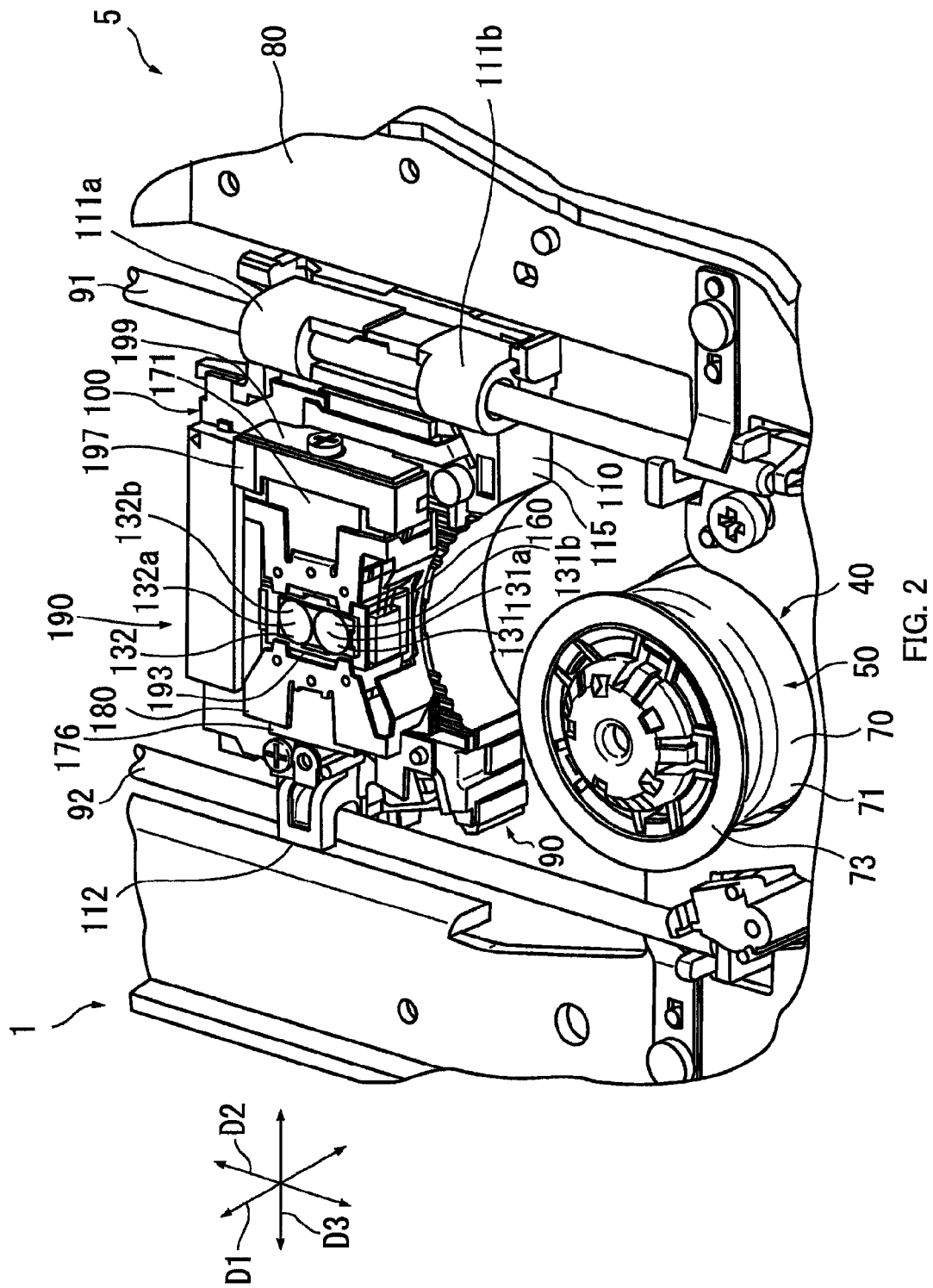
FIG. 2 is a perspective view of a pickup apparatus and a disc apparatus including the pickup apparatus.
Figure 3B:
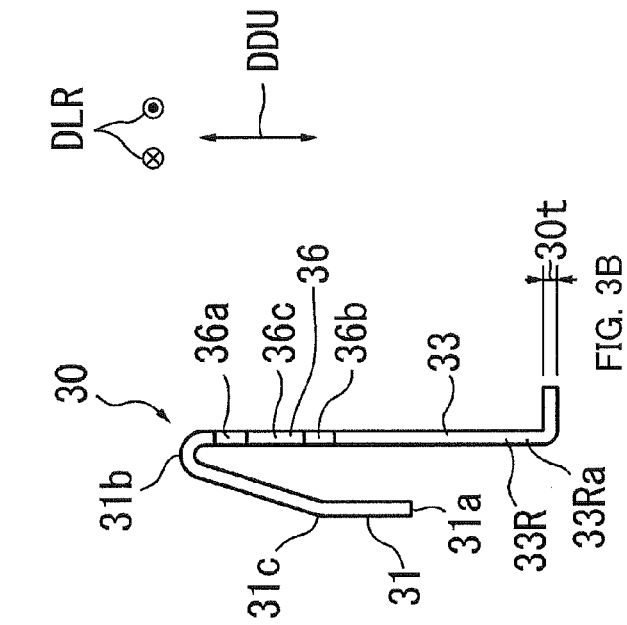
FIG. 3B is a side view illustrating an elastic member.
Figure 3A:
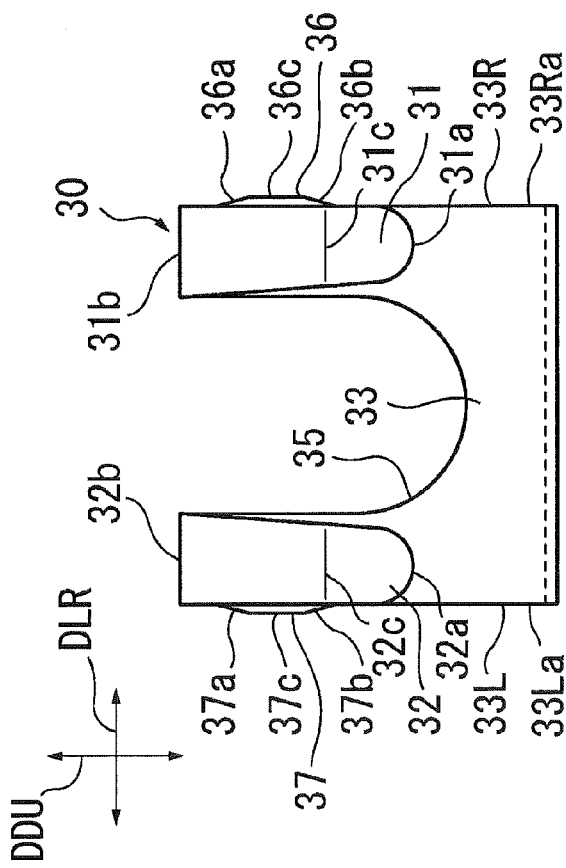
FIG. 3A is a front view of an elastic member according to a first embodiment of the present invention.
Figure 3C:
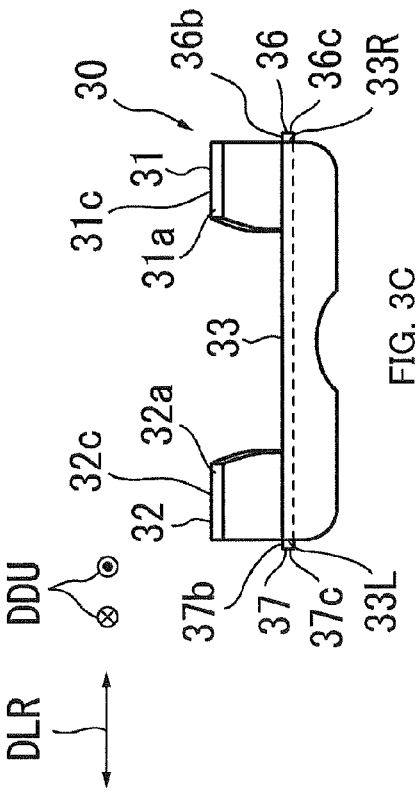
FIG. 3C is a bottom plan view illustrating an elastic member.
Figure 4:
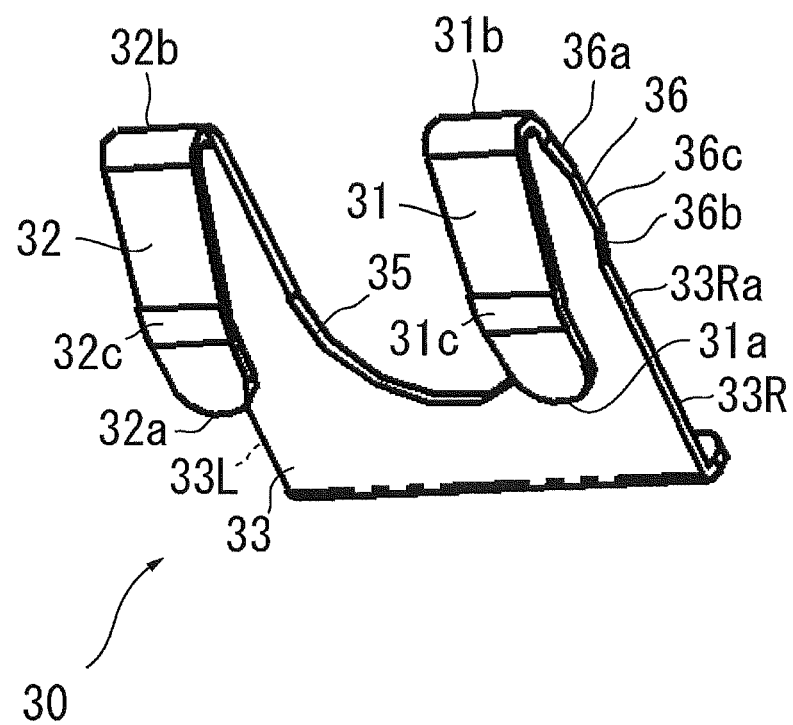
FIG. 4 is a perspective view illustrating an elastic member.
Figure 9:
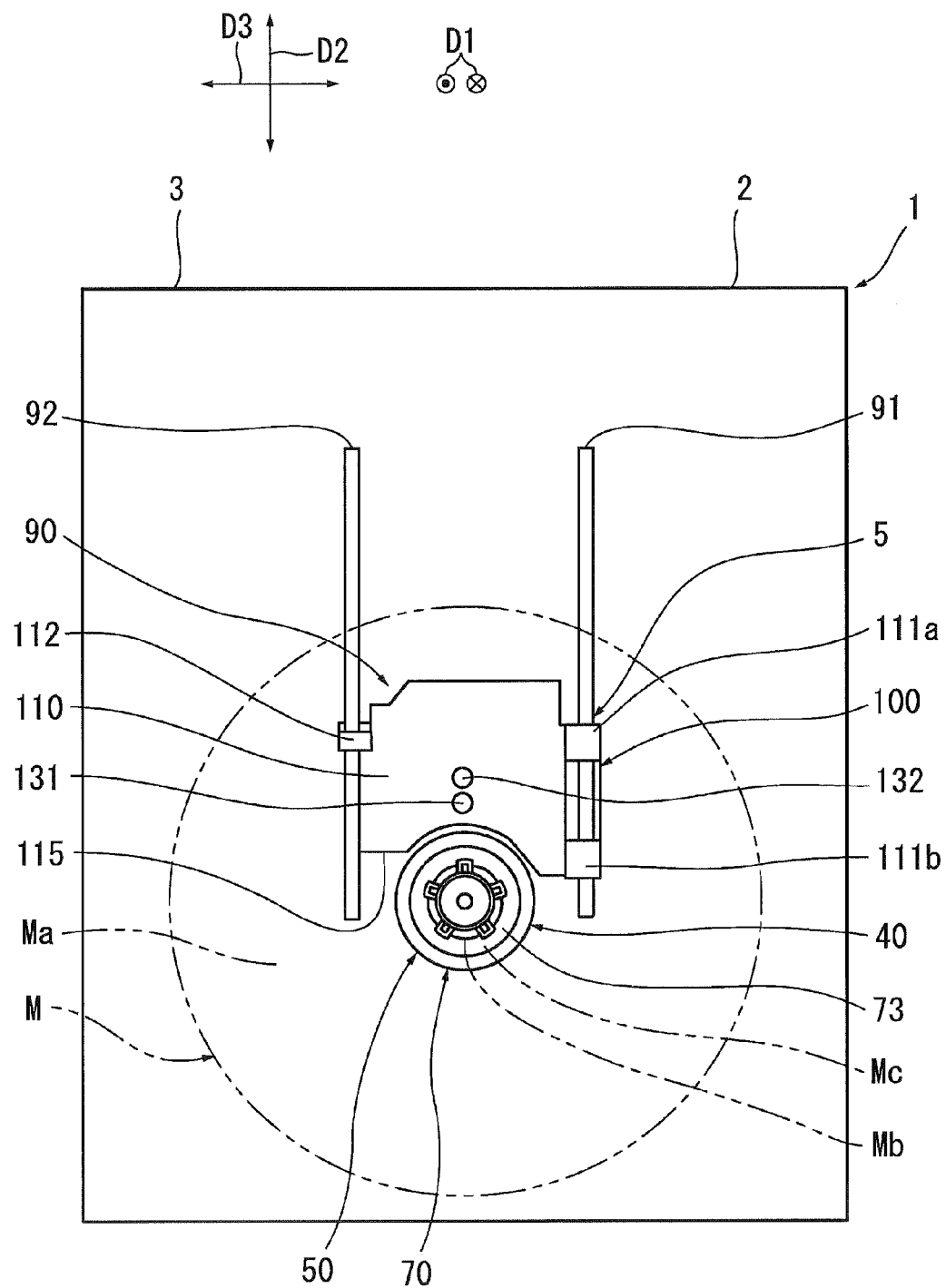
FIG. 9 is a schematic view of a pickup apparatus and a disc apparatus including the pickup apparatus.
Figure 10:
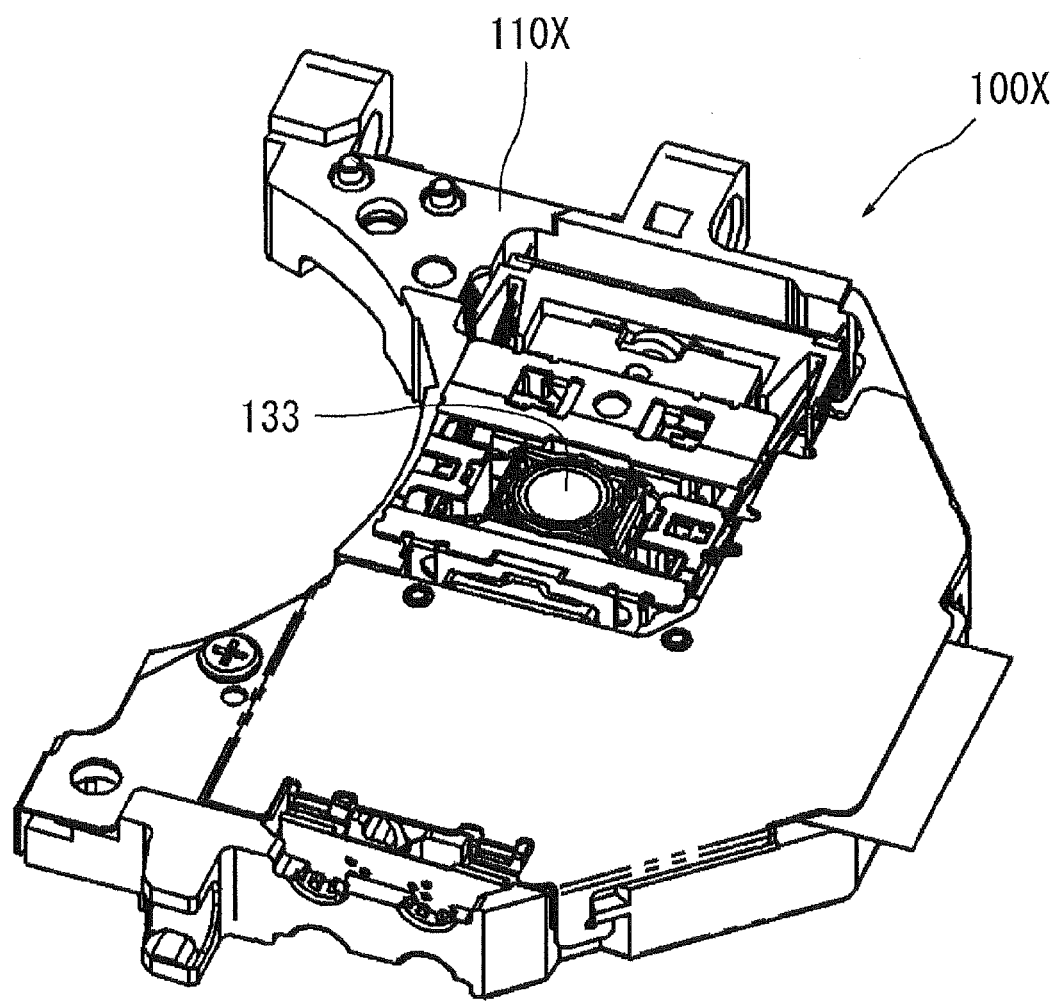
FIG. 10 is a perspective view of a pickup apparatus according to a second embodiment of the present invention.

As a pickup apparatus 100 depicted in FIGS. 1, 2, and 9, the optical pickup apparatus 100 capable of emitting a laser light beam (LASER: Light Amplification by Stimulated Emission of Radiation) through the optical members 131 and 132 being objective lenses, for example, is used. For example, the "optical pickup" or "optical pickup apparatus" will hereinafter be abbreviated as "OPU". The "objective lens" will hereinafter be abbreviated as "OBL", for example.

Data such as information recorded in the medium M such as the disc M is reproduced using the laser light beam converged by the OBLs 131 and 132 of the OPU 100 included in the driving unit assembly 5 of the disc apparatus 1. Data such as information is recorded in the medium M such as the disc M, using the laser light beam converged by the OBLs 131 and 132 of the OPU 100 included in the driving unit assembly 5 of the disc apparatus 1. Data such as information recorded in the medium M such as the disc M is erased using the laser light beam focused by the OBLs 131 and 132 of the OPU 100 included in the driving unit assembly 5 of the disc apparatus 1.

The OPU 100 configuring the driving unit assembly 5 of the disc apparatus 1 is adapted: to reproduce data, information, or a signal recorded in any of various types of medium M such as any of various types of disc M; to record data, information, or a signal in any of the various types of medium M such as any of the various types of writable or rewritable disc M; and to erase data, information, or a signal recorded in any of the various types of medium M such as any of the various types of writable or rewritable disc M.

The OPU 100 configuring the driving unit assembly 5 of the disc apparatus 1 is configured to support: media of "CD (Compact Disc)" (trademark) series/standard; media of "DVD (Digital Versatile Disc)" (registered trademark) series/standard; media of "HD DVD (High Definition DVD)" (registered trademark) series/standard; media of "CBHD (Chinese Blue High-Definition)" (for example, with the former name of "CH-DVD") series/standard, recognized as a medium based on a standard specified in China; and media of "BD (Blu-ray or Blu-ray Disc)" (registered trademark) series/standard, for example. The OPU 100 configuring the driving unit assembly 5 of the disc apparatus 1 is configured support at least one type of medium selected from a group including the above types of media, for example. More specifically, the OPU 100 configuring the driving unit assembly 5 of the disc apparatus 1 is configured to support any of the above plurality of media.

Although the media M can be the above-described various types of optical disc M, etc., for example, the media M can also be the media M in the following types. For example, the disc M can be the optical disc M, etc., provided with signal-surface portions Ma on both sides of the disc and capable of data writing/erasing, data rewriting, etc. The disc M can also be the optical disc M, etc., provided with a two-layer signal-surface portion Ma and capable of data writing/erasing, data rewriting, etc., for example. The media M can further be an optical disc, etc., for "HD DVD" and/or "Blu-ray or Blu-ray Disc" (not depicted) provided with a three-layer signal-surface portion and capable of data writing/erasing, data rewriting, etc., for example. The media M can still further be an optical disc, etc., for "Blu-ray or Blu-ray Disc" (not depicted) provided with a four-layer signal-surface portion and capable of data writing/erasing, data rewriting, etc., for example. The media M can yet further be the optical disc M, etc., capable of various types of writing, etc., on a label or the like by irradiation of the laser light beam onto a label-face portion of the optical disc M, for example. The signal-surface portion Ma and the label-face portion of the optical disc M each include a thin layer, etc., such as a metal thin film. Data, information, a signal, etc., are recorded on the signal-surface portion Ma including a metal thin film, etc., and an image, etc., are recorded on the label-face portion. The signal-surface portion Ma of the optical disc M is formed as the signal layer Ma including a metal thin film, for example. As such, the various types of optical disc M can be the optical discs each having a double-layer/multi-layer structure. For convenience, the various types of optical discs will be collectively described as the optical disc M.

Further, the optical disc apparatus 1 capable of emitting the laser light beam is used as the disc apparatus 1 depicted in FIGS. 1, 2, and 9. More specifically, as the disc apparatus 1, the optical disc apparatus 1 is used that is configured to support the various types of optical discs M such as "CD", "DVD", "HD DVD", and "CBHD", and "BD", for example. Further, as the driving unit assembly 5 configuring the disc apparatus 1, the traverse mechanism 5 is used that is configured to be provided with the OPU 100 capable of moving in a reciprocal manner substantially in the radial direction of the optical disc M so as to move across a signal portion (not depicted) in a substantially spiral shape such as pits or tracks of the optical disc M.

Further, the OPU 100 supporting the above-described various types of optical discs M is used as the OPU 100 configuring the optical disc apparatus 1 or the traverse mechanism 5. Sliding shafts 91 and 92 in a substantially linear round bar shape are used, for example, as the supports 91 and 92 composing the optical disc apparatus 1 or the traverse mechanism 5 and configured to support the OPU 100 so as to be able to move freely.

Further, a disc driving unit 40 that includes a spindle motor 71, a turn table 73, etc., and that is configured to drive and rotate the optical disc M is used as the driving unit 40 configured to rotate the optical disc M. The turn table 73 provided on the spindle motor 71 of the driving unit 40 has both of the functions of aligning the center of the optical disc M and securing the stability of the optical disc M when being rotated at high speed.

Further, as the base portion 80 composing the optical disc apparatus 1 or the traverse mechanism 5, a chassis 80 in a substantially plate-like shape is used which is attached with the pair of supports 91 and 92 mounted with the OPU 100 so as to be freely moved and the driving unit 40 including the spindle motor 71, the turn table 73, etc. The "chassis" means an incorporation base to be attached with components, for example.

The optical disc apparatus 1 includes the traverse mechanism 5 having the OPU 100, the sliding shafts 91 and 92, the disc driving unit 40, and the chassis 80. The traverse mechanism 5 composing the optical disc apparatus 1 and the disc apparatus 1 also includes other components except the above various components. However, the other components will not be described in detail.

Figure 7:
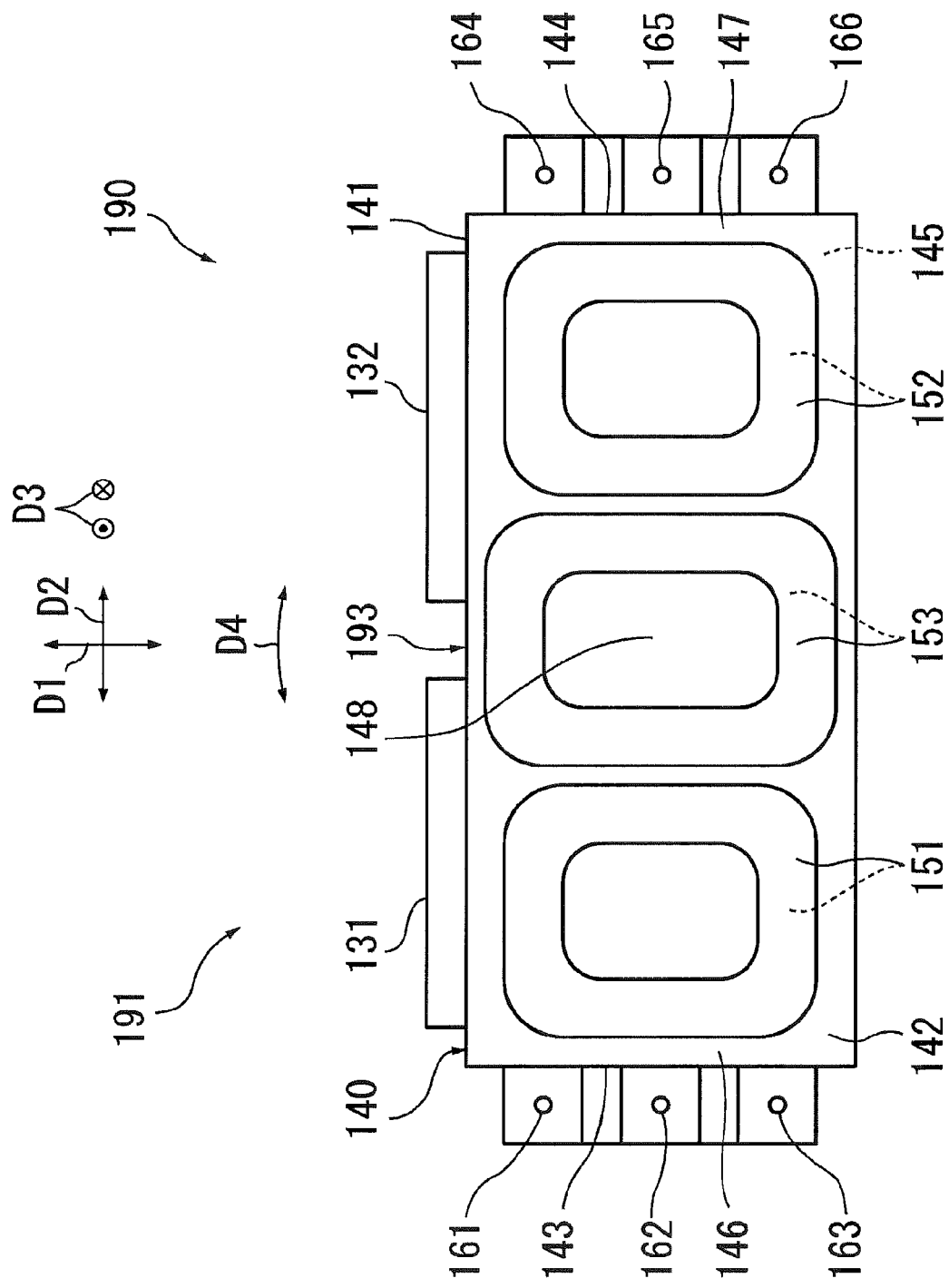
FIG. 7 is a side view of a moving unit of a driving unit of a pickup apparatus.
Figure 8A:
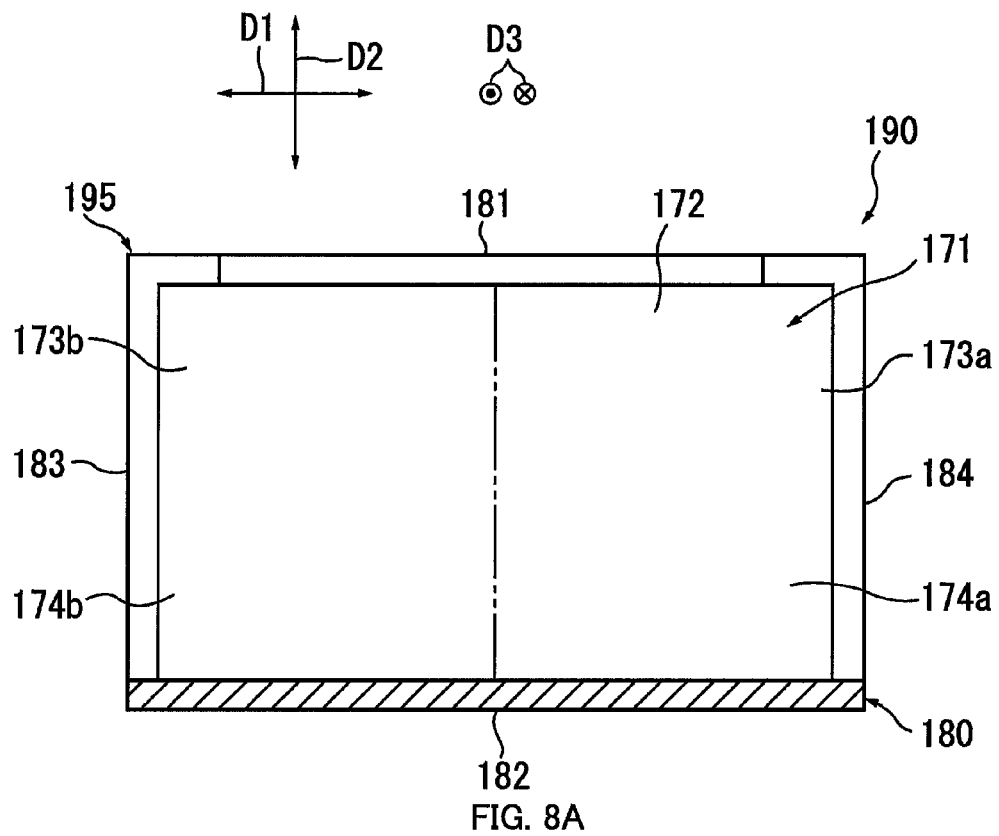
FIG. 8A is a cross-sectional view on one side of a fixing unit of a driving unit of a pickup apparatus.
Figure 8B:
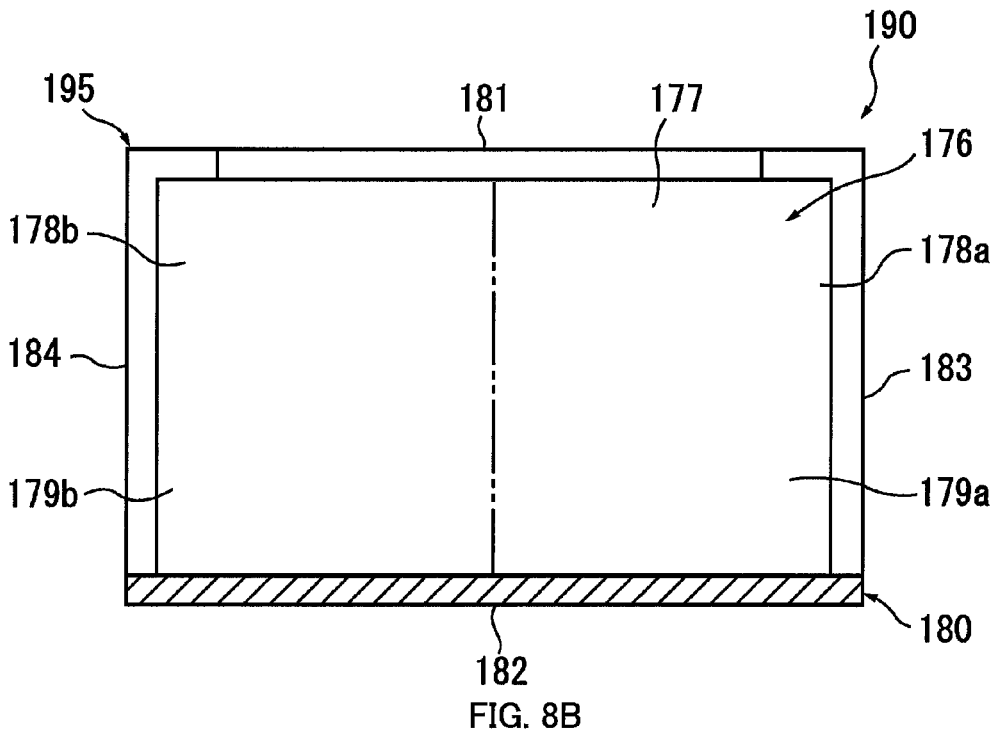
FIG. 8B is a cross-sectional view on the other side of a fixing unit of a driving unit of a pickup apparatus.

A moving unit 191 (FIG. 7) of a driving unit 190 of the OPU 100 includes: the plurality of OBLs 131 and 132 (FIGS. 1, 2, and 7); an optical member holding member 140 (FIG. 7); a plurality of coils 151, 152, and 153 (FIG. 7) corresponding to a plurality of magnetic members 171 and 176 (FIGS. 2 and 8); a driving main unit 193 including the optical member holding member 140 attached with the plurality of OBLs 131 and 132, the plurality of coils 151, 152, and 153, etc.; and a plurality of supporting members 161, 162, 163, 164, 165, and 166 (FIG. 7)/160 (FIG. 2) configured to support the driving main unit 193. The pair of magnetic members 171 and 176 (FIGS. 2 and 8), and a set of fixing members 180 compose a fixing unit 195 of the driving unit 190 (FIG. 8) of the OPU 100. The driving unit 190 (FIGS. 7 and 8) of the OBLs 131 and 132 of the OPU 100 (FIGS. 1, 2, and 9) is configured as an actuator 190, for example, including the fixing unit 195 and the moving unit 191. The driving main unit 193 including the optical member holding member 140 (FIG. 7), a so-called lens holder 140, attached with the two OBLs 131 and 132, the pair of coils in the front and the back totaling six thereof 151, 151, 152, 152, 153, and 153, etc., is used as a lens holder assembly 193, for example.

When an electric current is supplied to an optical member (not depicted) composing a light-emitting element, a laser light beam is emitted from the optical member (not depicted) composing the light-emitting element. This laser light beam is used to record information in the optical disc M (FIG. 9), reproduce information recorded in the optical disc M, or erase information recorded in the optical disc M. The light-emitting element can be a semiconductor laser, for example.

The OPU 100 depicted in FIGS. 1, 2, and 9 includes the optical member, a so-called laser diode (LD) (not depicted) configured to apply a laser light beam to the optical disc M (FIG. 9). The OPU 100 also includes a driving circuit unit, i.e., a so-called laser driver (LDD: LD Driver) (not depicted), configured to supply a current to the LD thereby causing the LD to emit light. The OPU 100 also includes a flexible flat circuit body configured to connect in an electrically conductive manner the electric components such as the LD and the electric components such as the LDD, and a flexible base such as a flexible printed circuit body (all not depicted). The flexible flat circuit body (flexible flat circuit/flexible flat cable) will be abbreviated as "FFC". The flexible printed circuit body (flexible printed circuit/flexible printed cable) will be abbreviated as "FPC".

For example, a current is passed from the LDD through the FPC to the LD not depicted, and the LD outputs the laser light beam. The laser light beam of 0.2 to 1,000 mW (milliwatt) for "CD" is emitted from the LD capable of emitting an infrared laser light beam having a wavelength of about 765 to 840 nm (nanometer) with a reference wavelength of about 780 nm, for example. The laser light beam of 0.2 to 1,000 mW for "DVD" is emitted from the LD capable of emitting a red laser light beam having a wavelength of about 630 to 685 nm with a reference wavelength of about 635 or 650 nm, for example. The LD is configured as a two-wavelength LD capable of emitting: a first-wavelength laser light beam having a wavelength of about 765 to 840 nm with a reference wavelength of about 780 nm; and a second-wavelength laser light beam having a wavelength of about 630 to 685 nm with a reference wavelength of about 635 nm or 650 nm, for example.

Depending on designs, specifications, etc., of the optical disc apparatus 1, the OPU 100, etc., a laser light beam of 0.2 to 1,000 mW for "CBHD", "HD DVD", and a Blu-ray/Blu-ray Disc" is emitted from the LD capable of emitting a blue violet laser light beam having a wavelength of about 340 to 450 nm, preferably, about 380 to 450 nm, and, more preferably, exceeding about 400 nm and equal to or shorter than 450 nm, with a reference wavelength of about 405 nm, for example. In this case, the LD is configured as a special LD capable of emitting laser light beams having a plurality of types of wavelengths of: the first-wavelength laser light beam having an emission wavelength of about 765 to 840 nm with a reference wavelength of about 780 nm; the second-wavelength laser light beam having an emission wavelength of about 630 to 685 nm with a reference wavelength of about 635 nm or 650 nm; and a third-wavelength laser light beam having an emission wavelength of about 340 to 450 nm with a reference wavelength of about 405 nm, for example. Any of various types of LDs, such as a single-wavelength LD capable of emitting a laser light beam having one of the above wavelengths, is usable as the LD. An LD capable emitting a laser light beam having at least one wavelength of the above wavelengths is usable as the LD.

The LD is configured to emit a laser light beam having an output value equal to or higher than 0.2 and equal to or lower than 1,000 mW, for example, and more specifically, equal to or higher than 0.5 and equal to or lower than 800 mW. For example, the laser light beam having an output value lower than 0.2 mW, result in the insufficient light amount of the laser light beam that is applied to the optical disc M, then is reflected therefrom, and reaches a light-receiving element (not depicted). When data, etc., of the optical disc M are reproduced, a laser light beam having an output value of several to several 10 mW is sufficient that is an output value equal to or higher than 0.2 mW and, preferably equal to or higher than about 0.5 mW and equal to or lower than about 20 mW, for example. When data, etc., are written into the optical disc M, a laser light beam having an output value of several 10 to several 100 mW is necessary. For example, when data, etc., are written into the optical disc M at high speed, a pulse laser light beam having a high output value may be necessary such as an output value exceeding 20 mW and, more specifically an output values such as 200, 400, 600, 800, 1,000 mW, etc.

As depicted in FIGS. 3 to 6, a mounting structure of an optical element 10 includes the optical element 10, an elastic member 30 used for mounting the optical element 10, and a holding unit 120 to be mounted with the optical element 10 and the elastic member 30. The elastic member 30 is pressed into the holding unit 120 as well as the optical element 10 is mounted on the holding unit 120 by the elastic member 30.

The optical element 10 is formed in a substantially rectangular plate shape, viewed from the front, allowing light to pass therethrough. In accordance with the optical element 10, the elastic member 30 is formed in a substantially concave shape, viewed from the front, allowing light to pass there through.

The holding unit 120 is formed using resin. The elastic member 30 is formed using metal.

The optical element 10 is configured to be a diffraction grating 10 dividing an incident light beam into a plurality of light beams. The first- and the second-wavelength laser light beams emitted from the LD each are divided into at least three light beams that are a main beam (zero order light) and two sub-beams (±first order diffracted light fluxes) by the optical element 10, a so-called diffraction grating 10, configured to be divided into a plurality of regions 11, 12, 13, and 14, e.g., divided into four.

When the optical element 10 is mounted on the holding unit 120, the optical element 10 is mounted on the holding unit 120 by the elastic member 30 mounted together with the optical element 10 on the holding unit 120. Since the elastic member 30 is pressed into the holding unit 120, it is avoided that the elastic member 30 is inadvertently displaced, which results in inaccurate position adjustment of the optical element 10, when adjusting the attachment position of the optical element 10 mounted together with the elastic member 30 on the holding unit 120, for example. The optical element 10 is able to be accurately mounted on the holding unit 120, for example.

The elastic member 30 is configured to be used when mounting the optical element 10 on the holding unit 120 with the optical element 10 aligned therewith. An elastic member base portion 33 is provided with press-fitting fixing portions 36 and 37 for positioning and fixing to the holding unit 120.

The elastic member base portion 33 is formed in a substantial plate shape. The press-fitting fixing portions 36 and 37 are configured to be protruding portions 36 and 37 protruding on a left and a right side portions 33L and 33R, viewed from the front, of the elastic member base portion 33.

The press-fitting fixing portion 36 includes inclined face portions 36a and 36b enabling the elastic member base portion 33 to be detachably mounted on the holding unit 120. The press-fitting fixing portion 37 has inclined face portions 37a and 37b enabling the elastic member base portion 33 to be detachably mounted on the holding unit 120.

Abutting force generating units 31 and 32 are provided extending from the elastic member base portion 33 and generate restoring elastic force against the optical element 10 and the holding unit 120.

The abutting force generating units 31 and 32 are folded back with respect to the elastic member base portion 33.

In this mounting structure of the optical element 10, an elastic member 30 according to the above embodiment is used as the elastic member 30.

When mounting the optical element 10 onto the holding unit 120 while aligning the optical element 10 with the holding unit 120, the optical element 10 is mounted on the holding unit 120 by the elastic member 30 that is mounted on the holding unit 120. Since the press-fitting fixing portions 36 and 37 for positioning and fixing to the holding unit 120 are included in the elastic member base portion 33, it is avoided that the elastic member 30 is inadvertently displaced, which results in inaccurate position adjustment of the optical element 10, when adjusting the position of the optical element 10 mounted together with the elastic member 30 on the holding unit 120. The optical element 10 is able to be accurately mounted on the holding unit 120.

The protruding portions 36 and 37 are provided on the left and the right side portions 33L and 33R, viewed from the front, of the elastic member base portion 33 of the elastic member 30. This enables lateral alignment executed when the elastic member 30 is mounted on the holding unit 120, as well as prevention of occurrence of lateral displacement of the elastic member 30 when the optical element 10 is moved in the right and left directions DLR from the initial mounted position, by position adjustment of the optical element 10. As a result, the contact position between the optical element 10 and the elastic member 30 is always stabilized. Accordingly, the stability, the reliability, etc., are able to be improved of the initial performance of the mounting structure of the optical element 10.

Taking into consideration mounting and demounting of the elastic member 30 and/or the diffraction grating 10 onto/from the holding unit 120 for mounting and repairing, the inclined face portions 36a and 36b/37a and 37b are formed on the press-fitting fixing portions 36/37 of the left and the right side portions 33L and 33R, viewed from the front, of the spring base portion 33 composing the elastic member 30, thereby being able to easily demountably mount the elastic member 30 onto the holding unit 120.

The inclined face portions 36a and 36b/37a and 37b are respectively formed on the press-fitting fixing portions 36/37 of the left and the right side portions 33L and 33R, viewed from the front, of the spring base portion 33 composing the elastic member 30, and the press-fitting fixing portions 36/37 in a substantially tapered shape, for example, are provided on the left and the right side portions 33L/33R, viewed from the front, of the spring base portion 33. As a result, when the elastic member 30 is mounted on the holding unit 120, the metal spring 30 digs into the resin holding unit 120, thereby being able to expect an effect of preventing misalignment of the elastic member 30 with respect to the holding unit 120.

The pickup apparatus 100 includes the mounting structure of the above optical element 10.

If the mounting structure of the above optical element 10 is configured, the optical element 10 is mounted on the holding unit 120 by the elastic member 30 with the position adjustment accurately performed. Therefore, the pickup apparatus 100 excellent in optical characteristics is able to be configured.

The elastic member, a method for mounting the optical element, and a method for assembling the pickup apparatus will be described in detail. The OPU 100 having the mounting structure of the optical element 10 includes: the optical element 10 configured to divide an incident light beam into a plurality of light beams; the elastic member 30 for the optical element used when mounting the optical element 10 onto the holding unit 120 for the optical element of a housing 110 while accurately aligning the optical element 10 with the holding unit 120; and the holding unit 120 for the optical element, including an accommodating portion 129 to which the optical element 10 and the elastic member 30 for the optical element are inserted to be mounted.

The optical element 10 is formed as the diffraction grating 10, a so-called grating, in a substantially rectangular plate shape viewed from the front, configured to divide an incident laser light beam into a plurality of laser light beams to emit the laser light beams. The spring 30 for the diffraction grating is used as the elastic member 30 for the optical element. The holder 120 for the diffraction grating is used as the holding unit 120 for the optical element. A substantially rectangular-box-like accommodating chamber 129 in a substantially concave shape viewed from the front, which composes the holder 120 for the diffraction grating, is used as the accommodating portion 129 composing the holding unit 120 for the optical element.

The holder 120 for the diffraction grating includes a base portion 110A composing the housing 110, and side plates 123A, 123B, 123C, and 123D each disposed standing substantially vertical to the base portion 110A. The second side plate 123B is disposed facing and substantially paralleling to the first side plate 123A. The third and the fourth side plates 123C and 123D are disposed orthogonal to the first and the second side plates 123A and 123B. The fourth side plate 123D is disposed facing and substantially paralleling to the third side plate 123C.

The spring 30 for the diffraction grating is demountably pressed into and fixed to the accommodating chamber 129 of the holder 120 for the diffraction grating, as well as when the diffraction grating 10 is mounted onto the accommodating chamber 129 of the holder 120 for the diffraction grating, the restoring elastic force is generated in the bent elastic bending parts 31 and 32 of the spring 30 for the diffraction grating, thereby accurately elastically holding and providing the diffraction grating 10 in the accommodating chamber 129 of the holder 120 for the diffraction grating, in a state where the attachment position of the diffraction grating 10 can be adjusted substantially in the left and right directions DLR and/or the up and down directions DDU and/or the rotational direction.

The diffraction grating 10 is transparent or translucent allowing light to pass therethrough, formed in a substantially rectangular plate shape viewed from the front. Corresponding to the diffraction grating 10, the spring base portion 33 of the spring 30 for the diffraction grating is formed in a substantially concave shape viewed from the front, such that the laser light beam can pass by without being applied thereto. A substantially semi-ellipse-like laser light transmission part 35 is formed in the spring base portion 33 of the spring 30 for the diffraction grating, by cutting a substantially semi-ellipse-like portion off from the spring base portion 33 of the spring 30 for the diffraction grating. For example, the spring base portion 33 of the spring 30 for the diffraction grating is formed by cutting the portion off in the semi-ellipse-like manner, in order to correspond to a diffraction grating adjusting hole (not depicted) of another member as well as to avoid interference of the laser light beam with the elastic bending parts 31 and 32 of the spring 30 for the diffraction grating, in an laser light optical path, and further to avoid occurrence of significant degradation in strength of the spring 30 for the diffraction grating. In order to avoid the interference of the laser light beam with the elastic bending parts 31 and 32 in a state of being bent, for example, when the spring 30 for the diffraction grating is seen from the front, the widths of the elastic bending parts 31 and 32 are gradually narrowed from folded-back portions 31b and 32b, which substantially correspond to the basal portions of the elastic bending parts 31 and 32, to substantially semicircular tip portions 31a and 32a.

Corresponding to the diffraction grating 10, the holder 120 for the diffraction grating is formed in a substantially concave shape viewed from the front, such that the laser light beam can pass by without being applied thereto. A substantially concave-like first laser light transmission part 125A is formed in the first side plate 123A of the holder 120 for the diffraction grating by cutting off a portion in a substantially concave manner from the first side plate 123A of the holder 120 for the diffraction grating. Similarly, a substantially concave-like second laser light transmission part 125B is formed in the second side plate 123B of the holder 120 for the diffraction grating, by cutting off a portion in a substantially concave manner from the second side plate 123B of the holder 120 for the diffraction grating. For example, the first and the second side plates 123A and 123B of the holder 120 for the diffraction grating each are formed by cutting off a portion in a substantially concave manner therefrom, in order to correspond to diffraction grating adjusting hole of another member as well as to avoid interference of the laser light beam with the first and the second side plates 123A and 123B of the holder 120 for the diffraction grating, in an laser light optical path.

The holder 120 for the diffraction grating is formed using synthetic resin. The spring 30 for the diffraction grating, including the protrusion-like press-fitting fixing portions 36 and 37, the elastic bending parts 31 and 32, and the spring base portion 33, is formed using metal. The diffraction grating 10 is formed using synthetic resin or glass.

The housing 110 composing the OPU 100 and including the holder 120 for the diffraction grating is formed using a thermal-resistant synthetic resin composite with a base material of a polyarylene sulfide (PAS)-series resin such as a polyphenylene sulfide (PPS) resin that is recognized to be excellent in mechanical properties, sliding properties, dimensional stability, thermal resistance, injection-molding properties, electric properties such as insulating properties, etc., and also recognized to be capable of more weight reduction than iron material, for example. A resin material is recognized as a material of smaller specific gravity than that of iron material, for example, and suitable for weight reduction. For example, since a synthetic resin material such as PAS or PPS is generally softer than a steel-base metal material, the protruding portions 36 and 37 of the left and the right side portions 33L and 33R, viewed from the front, of the spring base portion 33 composing the spring 30 for the steel-base metal diffraction grating dig into the left and the right side walls 123C and 123D composing the accommodating chamber 129 of the holder 120 for the diffraction grating of the resin hosing 110 when the spring 30 for the diffraction grating is mounted to the holder 120 for the diffraction grating of the housing 110.

A composite including PPS as base material thereof can be "DIC" (registered trademark) manufactured by DIC (used to be Dainippon Ink and Chemicals Inc.), for example. Specific composites including PPS as base material thereof can be "DIC·PPS FZ-2100" manufactured by DIC as a non-reinforced linear PPS product, "DIC·PPS FZ-2130" manufactured by DIC as a glass-fiber-30%-reinforced linear PPS product, and "DIC·PPS FZ-1140-D9" manufactured by DIC as a glass-fiber-40%-reinforced cross-linked PPS product, for example.

A molded body formed using a straight-chain PPS (linear PPS) composite is well stretchable and is excellent in toughness, for example. Whereas, a molded body formed using cross-linked PPS composite has higher elastic modulus as compared to that of the molded body formed using straight-chain PPS composite, for example. A molded body formed using a semi-cross-linked PPS composite has properties of both of the molded body formed using straight-chain PPS composite and the molded body formed using a cross-linked PPS composite, for example.

Otherwise, the housing 110 composing the OPU 100 is formed using metal such as non-ferrous metal or die-casting alloy including at least one kind of element selected from a group including aluminum (Al), magnesium (Mg), and zinc (Zn), for example. Aluminum, magnesium, and zinc are recognized to be excellent in corrosion resistance, and also recognized to be non-ferrous metal of a specific gravity smaller than that of iron. The housing 110 is formed using non-ferrous metal material such as aluminum alloy mainly including aluminum, for example. For example, since the non-ferrous metal material such as aluminum alloy mainly including aluminum is generally softer than a steel-base metal material, the protruding portions 36/37 of the left and the right side portions 33L/33R, viewed from the front, of the spring base portion 33 composing the spring 30 for the steel diffraction grating dig into the left and the right side walls 123C and 123D composing the accommodating chamber 129 of the holder 120 for the diffraction grating of the aluminum hosing 110 when the spring 30 for the diffraction grating is mounted to the holder 120 for the diffraction grating of the housing 100.

The spring 30 for the diffraction grating, etc., is formed using metal material, for example. For example, in order to efficiently form a large quantity of leaf springs 30, etc., at low price, the leaf springs 30, etc., are formed by press-molding such as punching, folding, and pressing performed for steel sheet such as rolled steel sheet, both not depicted. More specifically, the leaf springs 30, etc., are formed by punching and folding using a metal raw material sheet mainly including iron such as rolled steel sheet, for example, by a pressing machine (all not depicted). The metal raw material sheet mainly including iron can be various types of stainless steel sheets, rolled steel sheet, and band steel, for example.

For example, a metal material having "spring bending elastic limit" equal to or higher than a predetermined value based on "JIS G 4313" is used as the metal material forming the leaf springs 30, etc. The "spring bending elastic limit" is defined as stress on the boundary as to whether any permanent deformation occurs to a spring when load is repeatedly applied to the spring, for example. More specifically, a metal material having a "spring bending elastic limit", based on "JIS G 4313", at least equal to or higher than about 200 N/mm$^2$, and preferably, equal to or higher than about 300 N/mm$^2$ is used as the metal material forming the leaf spring 30, etc., for example. As such, the lower limit value of the "spring bending elastic limit" of the metal material forming the leaf spring 30, etc., is about 200 N/mm$^2$, and preferably, about 300 N/mm$^2$, for example. The upper limit value of the "spring bending elastic limit" is about 2,000 N/mm$^2$, for example, and about 1,500 N/mm$^2$, for example, depending on the material, for example, however, it is not limited thereto depending on the material, etc. The spring bending elastic limit of the stainless steel band for springs is tested on the basis of the repeated-bending-fatigue test and/or the moment-applying test based on "JIS H 3130", for example.

For example, in the cold rolled state based on "JIS G 4313", the spring bending elastic limit of SUS301-CSP (temper designation: 1/2H) is defined to be equal to or higher than about 315 N/mm$^2$, the elastic limit of SUS301-CSP (temper designation: 3/4H) is defined to be equal to or higher than about 390 N/mm$^2$, the elastic limit of SUS301-CSP (temper designation: H) is defined to be equal to or higher than about 490 N/mm$^2$, the elastic limit of SUS301-CSP (temper designation: EH) is defined to be equal to or higher than about 590 N/mm$^2$, and the elastic limit of SUS301-CSP (temper designation: SEH) is defined to be equal to or higher than about 650 N/mm$^2$. Further, for example, in the cold rolled state based on "JIS G 4313", the spring bending elastic limit of SUS304-CSP (temper designation: 1/2H) is defined to be equal to or higher than about 275 N/mm$^2$, the elastic limit of SUS304-CSP (temper designation: 3/4H) is defined to be equal to or higher than about 335 N/mm$^2$, and the elastic limit of SUS304-CSP (temper designation: H) is defined to be equal to or higher than about 390 N/mm$^2$. Further, for example, in the precipitation hardening thermal treatment state based on "JIS G 4313", the spring bending elastic limit of SUS632J1-CSP (temper designation: 3/4H) is defined to be equal to or higher than about 1,400 N/mm$^2$.

The leaf spring 30, etc., are formed using stainless steel such as stainless steel sheet or band steel recognized as a metal material excellent in corrosion resistance, for example. The stainless band steel for spring can be austenitic SUS301-series SUS301-CSP and SUS304-series SUS304-CSP, martensitic SUS420-series SUS420J2-CSP, and precipitation-hardened SUS631-series SUS631-CSP and SUS632-series SUS632J1-CSP, all specified based on "JIS G 4313", for example. "CSP (Cold Spring Plate)" is used as one of designations representing leaf spring. A specific stainless material can be austenitic stainless steel (SUS301 series, for example) including about 16% to 18% of chrome (Cr) and about 6 to 8% of nickel (Ni) and excellent in workability. Further, a specific stainless material can be austenitic stainless steel (SUS303 series, for example) including about 13% to 19% of chrome (Cr) and small amounts of sulfur (S) and phosphorus (P) and excellent in free cutting properties. Further, a specific stainless material can be austenitic stainless steel (SUS304 series, for example) that is non-magnetic including about 18% to 20% of chrome (Cr) and about 8% to 10.5% of nickel (Ni), and is excellent in corrosion resistance. Since austenitic stainless steel is recognized to be non-magnetic, only if the spring 30 for the diffraction grating, and the like are formed using austenitic stainless steel, any adverse effect of the magnetism acting on the OPU 100, etc., is avoided, for example. Since the above-described steel in SUS304 series includes chrome (Cr) and nickel (Ni), the steel in sus304 series is referred to as "chrome-nickel-base stainless steel", etc. The thin leaf spring 30 for the diffraction grating, etc., are formed using austenitic stainless steel (SUS301 series, for example) recognized as one type of the stainless steel for springs.

Further, for example, cold-rolled steel sheet and/or band steel can be SPCC, SPCD, SPCE, etc., defined based on "JIS G3141".

Otherwise, the leaf spring 30, etc., are formed using a metal material usable as a conductor used for dissipating static electricity, noise, etc., for example. More specifically, a substantially plate-like leaf spring 30, etc., are press-formed by executing press work, such as punching and folding, for a phosphor bronze plate material excellent in strength, spring properties, corrosion resistance, etc., and usable as a conductor. For example, the substantially flat plate-like leaf spring 30, etc., are formed by punching by a pressing machine, etc., using a metal raw material plate mainly including copper, for example. Preferably, copper alloy including about 3.5% to 9% of tin (Sn) and about 0.03% to 0.5% of phosphorus (P), for example, is used as the metal material mainly including copper (Cu). More specifically, it is preferable that "phosphor bronze for spring" excellent in strength, spring properties, fatigue resistance, corrosion resistance, etc., for example, is used as the copper alloy mainly including copper (Cu) and also including about 7% to 9% of tin (Sn) and about 0.03% to 0.35% of phosphorus (P). The phosphor bronze for spring can be C5210 (C5210P) and C5212 (C5212P) specified based on "JISH3130", for example.

The spring 30 for the diffraction grating is configured as the spring 30 for the diffraction grating used when installing the diffraction grating 10 in the accommodating chamber 129 of the holder 120 for the diffraction grating of the housing 110 while accurately aligning the optical element 10 with the holding unit 120. The press-fitting fixing portions 36 and 37 for positioning and fixing to the holder 120 for the diffraction grating are provided on the spring base portion 33 composing the spring 30 for the diffraction grating.

Further, the spring base portion 33 of the spring 30 for the diffraction grating is formed in a substantially plate shape in a substantially rectangular concave shape viewed from the front. The press-fitting fixing portions 36 and 37 of the spring 30 for the diffraction grating are formed as the pair of protruding portions 36 and 37 protruding in a substantially trapezoidal shape on the left and the right side portions 33L/33R, viewed from the front, of the spring base portion 33, respectively.

Further, the press-fitting fixing portions 36/37 of the spring 30 for the diffraction grating are formed as the protruding portions 36/37 including lateral/vertical pairs, viewed from the front, of gently tapered faces 36a and 36b/37a and 37b that enable the spring base portion 33 of the spring 30 for the diffraction grating to be easily detachably mounted onto the holder 120 for the diffraction grating.

More specifically, the first press-fitting fixing portion 36 on the right of the spring 30 for the diffraction grating is formed as the protruding portion 36 including the vertical pair, viewed from the front, of gently tapered faces 36a and 36b that enable the spring base portion 33 of the spring 30 for the diffraction grating to be easily detachably mounted onto the holder 120 for the diffraction grating, for example. The first press-fitting fixing portion 36 on the right of the spring 30 for the diffraction grating is formed as the protruding portion 36 protruding in a substantially trapezoidal shape, viewed from the front, and including: the vertical pair of gently tapered faces 36a and 36b; and a sliding contact face 36c located between the vertical pair of gently tapered faces 36a and 36b and substantially parallel to a right side face 33Ra, viewed from the front, of the spring base portion 33.

Further, for example, the second press-fitting fixing portion 37 on the left of the spring 30 for the diffraction grating is formed as the protruding portion 37 including the vertical pair, viewed from the front, of gently tapered faces 37a and 37b that enable the spring base portion 33 of the spring 30 for the diffraction grating to be easily detachably mounted onto the holder 120 for the diffraction grating. The second press-fitting fixing portion 37 on the left of the spring 30 for the diffraction grating is formed as the protruding portion 37 protruding in a substantially trapezoidal shape, viewed from the front, and including: the vertical pair of gently tapered faces 37a and 37b; and a sliding contact face 37c located between the vertical pair of gently tapered faces 37a and 37b and substantially parallel to a left side face 33La, viewed from the front, of the spring base portion 33.

The inclination angle of each of the vertical pair of gently tapered faces 36a and 36b on the right, viewed from the front, of the spring base portion 33, when the spring 30 for the diffraction grating is seen from the front, is, for example, an obtuse angle equal to or larger than about 135 degrees and smaller than about 180 degrees; preferably, an obtuse angle equal to or larger than about 150 degrees and equal to or smaller than about 175 degrees; and more preferably, an obtuse angle equal to or larger than about 160 degrees and equal to or smaller than about 170 degrees, with respect to the right side face 33Ra of the spring base portion 33. The inclination angle of each of the vertical pair of gently tapered faces 37a and 37b on the left, viewed from the front, of the spring base portion 33, when the spring 30 for the diffraction grating is seen from the front, is, for example, an obtuse angle equal to or larger than about 135 degrees and smaller than about 180 degrees; preferably, an obtuse angle equal to or larger than about 150 degrees and equal to or smaller than about 175 degrees; and, more preferably, an obtuse angle equal to or larger than about 160 degrees and equal to smaller than about 170 degrees, with respect to the left side face 33La of the spring base portion 33.

When the above angles are set at 180 degrees, for example, which is the angle of no inclination, the lateral and the vertical pairs, viewed from the front, of gently tapered faces 36a and 36b/37a and 37b are not formed. When the inclination angle is set at a large value exceeding about 175 degrees, for example, due to the specification, etc., of the spring 30 for the diffraction rating, concern is the difficulty of forming the lateral and the vertical pairs, viewed from the front, of gently tapered faces 36a and 36b/37a and 37b. When the inclination angle is set at a large value exceeding about 170 degrees, for example, due to the specification, etc., of the spring 30 for the diffraction rating, concern is also the difficulty of forming the lateral and the vertical pairs, viewed from the front, of gently tapered faces 36a and 36b/37a and 37b.

When the inclination angle is set at a small value smaller than about 160 degrees, for example, due to the specification, etc., of the spring 30 for the diffraction grating, concern is difficulty of inserting the spring 30 for the diffraction grating into the accommodating chamber 129 of the holder 120 for the diffraction grating, for example. When the inclination angle is set at a small value smaller than about 150 degrees, for example, due to the specification, etc., of the spring 30 for the diffraction grating, concern is also the difficulty of inserting the spring 30 for the diffraction grating into the accommodating chamber 129 of the holder 120 for the diffraction grating, for example. When the inclination angle is set at a small value smaller than about 135 degrees, for example, due to the specification, etc., of the spring 30 for the diffraction grating, concern is that the spring 30 for the diffraction grating is unable to be inserted into the accommodating chamber 129 of the holder 120 for the diffraction grating, for example.

The protrusion amount of each of the protruding portions 36/37 protruding in a substantially trapezoidal shape on the left and the right side portions 33L/33R, viewed from the front, of the spring base portion 33 having a thickness 30t of about 0.1 mm, for example, is about 0.02 to 0.5 mm, for example, relative to the left and the right side face portions 33La/33Ra, viewed from the front, of the spring base portion 33. When the protrusion amount of each of the protruding portions 36 and 37 is set at a small value smaller than about 0.02 mm, for example, concern is that the spring 30 for the diffraction grating is not securely installed in the accommodating chamber 129 of the holder 120 for the diffraction grating and freely moves in the accommodating chamber 129 of the holder 120 for the diffraction grating, for example. When the protrusion amount of each of the protruding portions 36 and 37 is set at a large value exceeding about 0.5 mm, for example, concern is that the spring 30 for the diffraction grating is unable to be inserted into the accommodating chamber 129 of the holder 120 for the diffraction grating, for example. As a result, it is preferable that the protrusion amount of each of the protruding portions 36/37 relative to the left and the right side face portions 33La/33Ra, viewed from the front, of the spring base portion 33 is set at about 0.05 to 0.2 mm. As such, the protrusion amount of each of the protruding portions 36/37 relative to the left and the right side face portions 33La/33Ra, viewed from the front, of the spring base portion 33 is set at about ⅕ of the thickness 30t of the spring 30 for the diffraction grating to five times the thickness 30t, preferably, about ½ thereof to twice the thickness, and more preferably, about the same length thereof, the spring 30 for the diffraction grating including the spring base portion 33 and the elastic bending parts 31 and 32.

The spring base portion 33 is configured to contact the diffraction grating 10 that is aligned, when the diffraction grating 10 is accurately aligned with and installed in the accommodating chamber 129 of the holder 120 for the diffraction grating as well as after the OPU 100 is assembled. The pair of elastic bending parts 31 and 32 in a substantially tongue-like shape, configured to generate the restoring elastic forces against the diffraction grating 10 and the holder 120 for the diffraction grating, is provided extending from the spring base portion 33.

For example, a substantially flat plate-like metal raw material composing the spring 30 for the diffraction grating is folded back in a substantially inverted V-shape, viewed from the side, at folding portions 31b and 32b, thereby providing the pair of elastic bending parts 31 and 32 each in a substantially tongue-like shape extending substantially in the direction away from the spring base portion 33, for example. When the elastic bending parts 31 and 32 of the spring 30 for the diffraction grating including the spring base portion 33 and the elastic bending parts 31 and 32 are in a natural state, the substantially elliptic tip portions 31a/32a from bend portions 31c/32c, at which the elastic bending parts 31/32 are substantially gently bent, to the tips are provided substantially in parallel to the spring base portion 33. The pair of elastic bending parts 31 and 32 in a substantially tongue-like shape is formed by being folded back with respect to the spring base portion 33, and the spring 30 for the diffraction grating is formed in a substantially reversed and inverted J-shape, viewed from the side, for example. The spring base portion 33 contacts the diffraction grating 10, and the bend portions 31c and 32c, at which the elastic bending parts 31 and 32 are substantially gently bent, contact the inside of the accommodating chamber 129 of the holder 120 for the diffraction grating.

When the spring 30 for the diffraction grating is seen from the front, the elastic bending parts 31 and 32 substantially overlap with the substantially upper half of the spring base portion 33 having the laser light transmission part 35 in a substantially U-shape formed thereon, for example. When the spring 30 for the diffraction grating is seen from the front, the width of the first elastic bending piece 31 is gradually narrowed from the folded-back portion 31b, substantially corresponding to the substantial basal portion of the elastic bending piece 31, to the substantially semicircular tip portion 31a. When the spring 30 for the diffraction grating is seen from the front, the width of the second elastic bending piece 32 is gradually narrowed from the folded-back portion 32b, substantially corresponding to the substantial basal portion of the elastic bending piece 32, to the substantially semicircular tip portion 32a.

For example, when the spring 30 for the diffraction grating in a natural state is seen from the side, the elastic bending parts 31 and 32 provided extending, in the direction away from the spring base portion 33 from the starting points of the folded-back portions 31b and 32b in an inverted substantial V-shape are substantially gently folded at the substantial centers of the elastic bending parts 31 and 32, thereby forming the gently bend portions 31c and 32c in the elastic bending parts 31 and 32, respectively. The elastic bending parts 31 and 32, which are portions from the bend portions 31c and 32c to the tips, are provided extending substantially in parallel to the spring base portion 33. When the diffraction grating 10 and the spring 30 for the diffraction grating are inserted into the accommodating chamber 129 of the holder 120 for the diffraction grating, and the position adjustment of the diffraction grating 10 is performed in a state where the elastic bending parts 31 and 32 are bent, the elastic bending parts 31 and 32 provided extending in the direction away from the spring base portion 33 from starting points of the substantially inverted V-shaped folded back portions 31b and 32b of the spring 30 for the diffraction grating viewed from the side, are provided extending in the direction toward the spring base portion 33 from the borders of the gently bend portions 31c and 32c in the substantial centers of the elastic bending parts 31 and 32.

When the position adjustment of the diffraction grating 10 is performed in the accommodating chamber 129 of the holder 120 for the diffraction grating in a state where the elastic bending parts 31 and 32 are bent, the load variations of the elastic bending parts 31 and 32 with respect to the displacement of the diffraction grating 10 are slightly absorbed, for example.

In the case where the spring 30 for the diffraction grating and the diffraction grating 10 are mounted onto the holder 120 for the diffraction grating of the housing 110, the bending amount of each of the elastic bending parts 31 and 32 is set at about 0.1 to 0.5 mm, for example, when the elastic bending parts 31 and 32 of the spring 30 for the diffraction grating including the spring base portion 33 and the elastic bending parts 31 and 32 having the thickness 30t of about 0.1 mm are bent toward the spring base portion 33, proceeding from their natural states, for example. When the bending amount of each of the elastic bending parts 31 and 32 toward the spring base portion 33 is set at a small value smaller than about 0.1 mm, for example, concern is that the restoring elastic force generated in the elastic bending parts 31 and 32 of the spring 30 for the diffraction grating is insufficient, for example. When the bending amount of each of the elastic bending parts 31 and 32 toward the spring base portion 33 is set at a large value exceeding about 0.5 mm, for example, concern is that the restoring elastic force generated in the elastic bending parts 31 and 32 of the spring 30 for the diffraction grating becomes too strong, causing difficult position adjustment of the diffraction grating 10, for example. As a result, it is preferable that the bending amount of each of the elastic bending parts 31 and 32 toward the spring base portion 33 is set at about 0.2 to 0.4 mm, for example. As such, the bending amount of each of the elastic bending parts 31 and 32 acquired when the elastic bending parts 31 and 32 of the spring 30 for the diffraction grating are bent toward the spring base portion 33 proceeding from their natural states, is about one to five times the thickness 30t of the spring 30 for the diffraction grating, and preferably, about two to four times the thickness, the diffraction grating including the spring base portion 33 and the elastic bending parts 31 and 32.

In the mounting structure of the diffraction grating 10, the spring 30 for the diffraction grating in an embodiment described above is used as the leaf spring 30.

The OPU 100 includes the mounting structure of the diffraction grating 10.

If the mounting structure of the above described diffraction grating 10 is configured, the diffraction grating 10 is accurately position adjusted and mounted onto the holder 120 for the diffraction grating of the housing 110 using the spring 30 for the diffraction grating. Thus, the OPU 100 excellent in optical characteristics is configured.

When the diffraction grating 10 is aligned and installed in the accommodating chamber 129 of the holder 120 for the diffraction grating of the housing 110, the diffraction grating 10 is provided so as to be elastically held with accuracy in the accommodating chamber 129 of the holder 120 for the diffraction grating of the housing 110, in a state where the attachment position of the diffraction grating 10 is adjustable substantially in the left and right directions DLR and/or the up and down directions DDU and/or the rotational direction, by the restoring elastic force generated in the bent elastic bending parts 31 and 32 of the spring 30 for the diffraction grating mounted together therewith in the accommodating chamber 129 of the holder 120 for the diffraction grating of the housing 110. The press-fitting fixing portions 36 and 37 for positioning and fixing to the holder 120 for the diffraction grating are provided on the spring base portion 33 composing the spring 30 for the diffraction grating, and the spring 30 for the diffraction grating is demountably pressed in to be fixed to the accommodating chamber 129 of the holder 120 for the diffraction grating. Thus, for example, when the attachment position of the diffraction grating 10 mounted together with the spring 30 for the diffraction grating in the accommodating chamber 129 of the holder 120 for the diffraction grating of the housing 110 is adjusted substantially in the left and right directions DLR and/or the up and down directions DDU and/or the rotational direction, such a malfunction is avoided that the spring 30 for the diffraction grating is inadvertently displaced substantially in the left and right directions DLR and/or the up and down directions DDU and/or the rotational direction in the accommodating chamber 129 of the holder 120 for the diffraction grating of the housing 110, resulting in inaccurate position adjustment of the diffraction grating 10 associated with such displacement, for example. Thus, the diffraction grating 10 is provided in such a manner to be elastically held with accuracy in the accommodating chamber 129 of the holder 120 for the diffraction grating of the housing 110.

The pair of protruding portions 36 and 37 is provided protruding in a substantially trapezoidal shape, on the left and the right side portions 33L and 33R, viewed from the front, of the spring base portion 33 of the spring 30 for the diffraction grating, thereby enabling the positioning substantially in the left and right directions DLR, i.e., lateral positioning, executed when the spring 30 for the diffraction grating is installed in the accommodating chamber 129 of the holder 120 for the diffraction grating of the housing 110, and also thereby preventing lateral displacement of the spring 30 for the diffraction grating when the diffraction grating 10 is moved from its initial attachment position substantially in the left and right directions DLR by adjusting the position of a substantial central dividing line 16 of the diffraction grating 10. As a result, the contact position between the diffraction grating 10 and the spring 30 for the diffraction grating becomes always stabilized. Further, associated with this, in the mounting structure of the diffraction grating 10, the initial performance is improved in stability and the phase shift of the diffraction grating 10 is improved even in the reliability evaluation, etc., in a heat shock (H/S) test, etc.

As to the protrusion shape of the protruding portions 36 and 37 of the spring 30 for the diffraction grating, considering mounting of the spring 30 for the diffraction grating and/or the diffraction grating 10 onto the holder 120 for the diffraction grating of the housing 110 and demounting thereof therefrom when repairing, the lateral and the vertical pairs, viewed from the front, of gently tapered faces 36a and 36b/37a and 37b are formed on the protruding portions 36/37 of the left and the right side portions 33L/33R, viewed from the front, of the spring base portion 33 composing the spring 30 for the diffraction grating, so that the protruding portions 36/37 are formed in a substantially tapered shape, thereby, being able to easily demountably mount the spring 30 for the diffraction grating onto the holder 120 for the diffraction grating of the housing 110.

The lateral and the vertical pairs, viewed from the front, of gently tapered faces 36a and 36b/37a and 37b are formed on the protruding portions 36/37 of the left and the right side portions 33L/33R, viewed from the front, of the spring base portion 33 composing the spring 30 for the diffraction grating, so that the protruding portions 36/37 in a substantially tapered shape, so-called taper portions, for example, are provided on the left and the right side portions 33L/33R, viewed from the front, of the spring base portion 33 composing the spring 30 for the diffraction grating, which causes the metal spring 30 to dig into the holder 120 for the diffraction grating of the housing 110 made of resin, so-called plastic, when the spring 30 for the diffraction grating is attached to the holder 120 for the diffraction grating of the housing 110, thereby expecting an effect of preventing misalignment of the spring 30 for the diffraction grating with respect to the holder 120 for the diffraction grating of the housing 110.

The attachment position of the diffraction grating 10 is adjusted and the diffraction grating 10 is accurately mounted onto the accommodating chamber 129 of the holder 120 for the diffraction grating of the housing 110, and thereafter, the holder 120 for the diffraction grating and/or the spring 30 for the diffraction grating are/is securely fixed to the inside of the accommodating chamber 129 of the holder 120 for the diffraction grating of the housing 110 using bonding member/adhesive, for example.

The spring 30 for the diffraction grating and/or the diffraction grating 10 are/is detachably mounted onto the holder 120 for the diffraction grating of the housing 110 before application and fixation of the bonding member/adhesive. However, after the application and fixation of the bonding member/adhesive, the spring 30 for the diffraction grating and/or the diffraction grating 10 are/is undetachably mounted onto the holder 120 for the diffraction grating of the housing 110.

The diffraction grating 10 will be described in detail. A diffraction face portion 10a of the diffraction grating 10 is formed as one face portion 10a supporting diffraction of a plurality of types of laser wavelength light beams, acting both as the diffraction face portion 10a configured to split the first laser wavelength light beam into at least one first main beam and two first sub-beams and as the diffraction face portion 10a configured to split the second laser wavelength light beam into at least one second main beam and two second sub-beams. The diffraction face portion 10a of the diffraction grating 10 includes a repetitive periodic structure with minute projections/recesses. The back face portion on the back of the diffraction face portion 10a is formed as a smooth face portion, for example, without the repetitive periodic structure with minute projections/recesses formed on the back face portion on the back of the diffraction face portion 10a composing the diffraction grating 10.

When the diffraction face portion 10a of the diffraction grating 10 is formed as such, generation of unnecessary diffracted light beams is suppressed and degradation in efficiency of the laser light beams is prevented, thereby configuring the OPU 100 capable of further reduction in price.

When the diffraction face portion 10a of the diffraction grating 10 is formed as one face portion 10a supporting diffraction of a plurality of types of laser wavelength light beams, acting both as the diffraction face portion 10a configured to split the first laser wavelength light beam into at least one first main beam and two first sub-beams, and as the diffraction face portion 10a configured to split the second laser wavelength light beam into at least one second main beam and two second sub-beams, it is avoided that the first main beam and the first sub-beams of the first laser wavelength light beam are unnecessarily diffracted, thereby degrading the light efficiency of the first main beam and the first sub-beams of the first laser wavelength light beam, and also avoided that the second laser wavelength light beam is unnecessarily diffracted, thereby degrading the light efficiency of the second laser wavelength light beam.

Since the diffraction face portion 10a of the diffraction grating 10 is formed as one face portion 10a supporting diffraction of a plurality of types of laser wavelength light beams, acting both as the diffraction face portion 10a configured to split the first laser wavelength light beam into at least one first main beam and two first sub-beams, and as the diffraction face portion 10a configured to split the second laser wavelength light beam into at least one second main beam and two second sub-beams, the diffraction grating 10 is configured with reduced parts thereof to be worked on, reduced working processes therefor, etc. Since the parts to be worked on, the working processes, etc., of the diffraction grating 10 are reduced, the diffraction grating 10 is reduced in price. Associated with this, it becomes possible to configure the OPU 100 enables reduction in price.

The diffraction grating 10 is provided with phase shift regions 11 and 14 each causing a phase shift of π radian in a part of the laser light beams emitted from the LD. The diffraction grating 10 is divided into at least four regions 11 to 14, which are the first region 11 in a substantially rectangular shape, the second region 12 in a substantially linear shape adjacent to the first region 11, the third region 13 in a substantially linear shape adjacent to the second region 12, and the fourth region 14 in a substantially rectangular shape adjacent to the third region 13. The diffraction grating 10 is divided into a plurality of regions 11 to 14. A predetermined periodic structure is configured in each of the regions 11 to 14.

For the sake of clarity of phase states of the second region 12 and the third region 13, the second and the third regions 12 and 13 are depicted with some widths for convenience sake. In practice, the second and the third regions 12 and 13 of the diffraction grating 10 are in a thin linear shape with a width 10w of about 20 to 200 µm, for example. The periodic structure of each of the regions 11 to 14 composing the diffraction grating 10 is a repetitive periodic structure with minute projections/recesses. The diffraction grating 10 is a glass plate or a plastic plate having lateral and longitudinal dimensions of about 3 to 10 mm and a thickness of about 0.3 to 5 mm, for example.

The diffraction grating 10 divided into the plurality of regions 11 to 14 facilitates favorable error signal detection by the OPU 100 for the signal-surface portion Ma of the medium M. For example, it facilitates favorable tracking by the OPU 100 on the signal-surface portion Ma of the medium M. The diffraction grating 10 divided into the plurality of regions 11 to 14 is configured, thereby applying at least three independent condensed light spots onto the signal-surface portion Ma of the medium M. At least three condensed light spots are independently applied onto the signal-surface portion Ma of the medium M, which facilitates avoiding degradation in accuracy in detecting an error signal such as a tracking error signal during recording, reproducing, etc., of two or more types of media M whose track pitches are different from each other. Thus, the OPU 100 capable of easily performing tracking control can be provided.

The diffraction grating 10 is divided into an even number of regions 11 to 14.

When the diffraction grating 10 divided into an even number of regions 11 to 14 is configured, the condensed light spots formed on the signal-surface portion Ma of the medium M are formed as accurate condensed light spots. For example, the diffraction grating 10 is divided by the border line 16 between the second region 12 and the third region 13 adjacent to the second region 12 of the diffraction grating 10 into at least two equal parts, i.e., an even number of parts, which are one region 18 including the first region 11 and the second region 12 adjacent to the first region 11, and the other region 19 including the third region 13 and the fourth region 14 adjacent to the third region 13, thereby facilitating irradiating, with the light beam to be applied to the diffraction grating 10, one region 18 and the other region 19 of the diffraction grating 10 in a substantially equal manner when the diffraction grating 10 is mounted on the OPU 100. It is facilitated to irradiate, with the light beam, one region 18 and the other region 19 of the diffraction grating 10 in a substantially equal manner, thereby facilitating accurate mounting of the diffraction grating 10 onto the OPU 100. Thus, it is facilitated to form the accurate condensed light spots on the signal-surface portion Ma of the medium M. Associated with this, accuracy is improved in detecting an error signal such as a tracking error signal during recording, reproducing, etc., of two or more types of media M whose track pitches are different. It is facilitated to accurately execute the tracking of the OPU 100 for the signal-surface portion Ma of the medium M.

The diffraction grating 10 is divided into at least four regions 11 to 14: the first region 11; the second region 12, which is adjacent to the first region 11 and includes a periodic structure different from that of the first region 11; the third region 13, which is adjacent to the second region 12 and includes a periodic structure different from that of the second region 12; and the fourth region 14, which is adjacent to the third region 13 and includes a periodic structure different from that of the third region 13. The diffraction grating 10 is configured as a so-called quadrisected in-line grating.

If the diffraction grating 10 divided into the plurality of regions 11 to 14 is mounted on the OPU 100, the error signal detection is favorably executed by the OPU 100 for the signal-surface portion Ma of the medium M. For example, the tracking is favorably executed of the OPU 100 for the signal-surface portion Ma of the medium M. Since the diffraction grating 10 is configured to be divided into the four regions 11 to 14, the signal-surface portion Ma of the medium M is irradiated with at least three independent condensed light spots. Since at least three condensed light spots are each independently applied to the signal-surface portion Ma of the medium M, it is avoided to degrade the accuracy in detection of an error signal such as a tracking error signal associated with displacement of the OBLs 131/132 when data is recorded into or reproduced from two or more types of media M having different track pitches, for example. Thus, it is possible to provide the OPU 100 whose tracking control is facilitated.

The diffraction grating 10 includes: the one region 18 in a substantially rectangular shape including the first region 11 and the second region 12 adjacent to the first region 11; and the other region 19 also in a substantially rectangular shape including the third region 13 and the fourth region 14 adjacent to the third region 13. A width 11w of the first region 11 and a width 14w of the fourth region 14 of the diffraction grating 10 are set to be substantially equal widths. A width 12w of the second region 12 and a width 13w of the third region 13 of the diffraction grating 10 are set to be substantially equal widths. The diffraction grating 10 is divided into two equal parts of the one region 18 and the other region 19 composing the diffraction grating 10, by the border line 16 between the second region 12 and the third region 13 adjacent to the second region 12 of the diffraction grating 10. The diffraction grating 10 is divided into an even number of parts.

As a result, each of the condensed light spots formed on the signal-surface portion Ma of the medium M are formed as accurate condensed light spot. The diffraction grating 10 is divided into two equal parts, which are the one region 18 including the first region 11 and the second region 12 adjacent to the first region 11; and the other region 19 including the third region 13 and the fourth region 14 adjacent to the third region 13, by the border line 16 between the second region 12 and the third region 13 adjacent to the second region 12 of the diffraction grating 10 divided into an even number of parts, thereby easily adjusting the optical axis of the laser light beam emitted from the LD and applied to the diffraction grating 10 using a camera for adjusting the optical axis, etc., not depicted, for example, when the diffraction grating 10 is installed in the housing 110 of the OPU 100. The laser light beam emitted from the LD, applied to the diffraction grating 10, and thereafter having passed through the OBLs 131/132 is observable with a camera for adjusting an optical axis, for example.

Since the quadrisected diffraction grating 10 is provided with the border line 16 configured to divide the diffraction grating 10 at its substantial center into two equal parts and configure the one region 18 and the other region 19 in a substantially rectangular shape, it is facilitated that the laser light beam is applied, in such a manner as to be divided into substantially equal two parts, to one region 18 and the other region 19 in a substantially rectangular shape composing the diffraction grating 10 when the optical axis of the laser light beam is adjusted using a camera for adjusting an optical axis, or the like.

It is facilitated that the laser light beam is applied, in such a manner as to be divided into substantially equal two parts, to the one region 18 and the other region 19 in a substantially rectangular shape composing the diffraction grating 10, thereby facilitating that the diffraction grating 10 is easily installed in the housing 110 of the OPU 100 with the positioning adjustment thereof being accurately made thereto. Thus, it is facilitated to form the condensed light spots accurately on the signal-surface portion Ma of the medium M. Associated with this, it is facilitated to accurately execute the tracking of the OPU 100 for the signal-surface portion Ma of the medium M.

The bonding member/adhesive will be described. The bonding member/adhesive can be an electron radiation curing adhesive such as an ultraviolet curing adhesive mainly including a one-component or two-component epoxy-based resin, a one-component acrylic resin, etc., for example. Further, the adhesive can be a thermosetting resin mainly including a one-component or two-component epoxy-based resin, modified acrylic resin, etc., for example. The adhesive including a one-component resin, etc., is excellent in bonding workability, for example, and the adhesive including a two-component resin is excellent in price property of the adhesive, etc., for example.

More specifically, the OPU 100 includes bonding members, that is, the above described adhesives which bond and fix various components to each other without separation therebetween. The adhesive can be resin/polymer such as a one-component and/or a two-component epoxy-based resin(s), an acrylic resin, a urethane-based resin, or a methacrylic resin, for example. For example, any one type resin/polymer selected from the above group of resins is used as polymer/base material composing the one-component and/or two-component adhesive(s). The epoxy-based resin(s), the urethane-based resin, the thermosetting acrylic resin, etc., are thermosetting resins/polymers, for example. A curing agent for the base material of the two-component polymer can be a polymer such as: polythiol, etc.; and an amine-based material such as polyamideamine, modified polyamine, and tertiary amine. For example, any one polymer selected from the above group of polymers is used as the curing agent composing the two-component adhesive. The adhesive including a one-component polymer is excellent in boding workability, for example, and the adhesive including a two-component polymer is excellent in price property of the adhesive.

Further, an electron radiation curing adhesive, having a property of being cured by irradiation with an electron beam such as a light beam, is also usable as the adhesive. Specifically, an ultraviolet curing adhesive having a property of being cured by irradiation with ultraviolet light is also usable as the adhesive. More specifically, an ultraviolet curing adhesive having a property of being cured by irradiation with ultraviolet light and a thermosetting property is also usable as the adhesive. For example, combined use of an ultraviolet curing adhesive and a thermosetting adhesive is possible. An ultraviolet curing adhesive is cured in a short time by being irradiated with ultraviolet light having a wavelength of about 350 to 380 nm, for example. The bonding is executed using an ultraviolet curing adhesive recognized as one type of electron radiation curing adhesive.

The adhesive will be described in detail. The adhesive can be a one-component or a two-component adhesive, for example. For example, at least one polymer of polymers selected from a group including an epoxy-based polymer, a modified acrylic polymer, a polyurethane-based polymer, an acrylic-ester-based polymer, and a methacrylate-ester-based polymer is used as the polymer/base material composing the one-component and/or the two-component adhesive(s), for example. For example, the resin composing the one-component and/or the two-component adhesive(s) after being cured can be at least one resin of resins selected from a group including an epoxy-based resin, a modified acrylic resin, a polyurethane-based resin, a poly-acrylic resin, and a polymethacrylic resin, for example. Further, for example, at least one polymer of polymers selected from a group including polythiol, polyamideamine, modified polyamine, and tertiary amine is used as the curing agent composing the two-component adhesive.

Further, usable is one whose bonding process is executed using a two-component ultraviolet radiation curing adhesive, for example. The two-component ultraviolet radiation curing adhesive can be a two-component epoxy-based ultraviolet curing adhesive, for example. A polymer-based adhesive such as an acrylic adhesive or an epoxy-based adhesive is used, thereby absorbing a high-frequency vibration component, for example.

The specific epoxy-based adhesive can be "Araldite (registered trademark) 2010-1 and 2012" and the like manufactured by Hantsman in Switzerland (Hantsman Advanced Materials, GmbH) and distributed by Hantsman Japan, Co., Ltd., for example. Araldite (registered trademark) 2010-1 has a viscosity of about 80,000 mPas under the temperature of 23° C., and is excellent in a fast curing property. For example, Araldite (registered trademark) 2012 is formed as a two-component adhesive including a base material "AW2104" and a curing agent "HW2934", has a viscosity of about 25,000 to 35,000 mPas under the temperature of 23° C., and is excellent in a general-purpose property and a fast curing property.

A specific polyurethane-based adhesive can be "Araldite (registered trademark) 2055" and the like manufactured by Hantsman in Switzerland (Hantsman Advanced Materials, GmbH) and distributed by Hantsman Japan, Co., Ltd., for example. Araldite (registered trademark) 2055 is recognized as a thixotropy one, for example, has a tensile shear strength of about 9,000 mPas, for example, and is excellent in a gap filling property, for example. The "thixotropy" means a phenomenon that the apparent viscosity of an adhesive is lowered by being stirred in the solid-liquid co-existing state where a portion of the adhesive is solidified when a state thereof proceeding from a liquid state to a solid state, for example.

A specific modified acrylic adhesive can be "Araldite (registered trademark) 2021" and the like manufactured by Hantsman in Switzerland (Hantsman Advanced Materials, GmbH) and distributed by Hantsman Japan, Co., Ltd., for example. For example, Araldite (registered trademark) 2021 is formed as a two-component adhesive including a base material "XD4661A" and a curing agent "XD4661D", has viscosity at about 60,000 mPas under the temperature of 23° C., and is more excellent in the fast curing property than any other type of Araldite (registered trademark) with its shortest curing time of about 18 minutes.

The adhesive can be an anaerobic adhesive such as an anaerobic strong adhesive manufactured by ThreeBond Co., Ltd., for example. An anaerobic adhesive is defined as an adhesive that is not cured when the adhesive is in contact with air, for example, and that is not cured by being isolated from air. Since the anaerobic strong adhesive manufactured by ThreeBond Co., Ltd., also has an electron radiation curing property such as an ultraviolet radiation curing property, the extra anaerobic adhesive running out of the bonding spot is cured by being irradiated with an electron beam such as ultraviolet light, for example. The main component composing the anaerobic adhesive can be (metha) acrylic ester, methacrylate ester, or methacrylate-ester monomer, for example.

An adhesive in "1300 Series" from ThreeBond Co., Ltd., formed as the anaerobic adhesive, can be "ThreeBond (registered trademark) 1359D", "ThreeBond (a registered trademark) 1373N, and the like, for example. ThreeBond (registered trademark) 1359D includes (metha) lacrylic ester as its main component before being cured, has a viscosity of about 14,000 mPas at the room temperature, for example, has a fast curing property, also has an electron radiation curing property such as an ultraviolet radiation curing property, becomes a polyacrylic resin after being cured, and is excellent in vibration resistance, thermal resistance, flexibility, surface adhesiveness, etc. ThreeBond (registered trademark) 1373N includes methacrylate ester as its main component before being cured, has a viscosity of about 90 mPas at the room temperature, for example, has a fast curing property, also has an electron radiation curing property such as an ultraviolet radiation curing property, becomes a methacrylic resin after being cured, and is excellent in vibration resistance, thermal resistance, a low-temperature curing property, etc.

The adhesive can also be an instant adhesive (Gold Label Series) manufactured by ThreeBond Co., Ltd., for example. The instant adhesive is defined as an adhesive that fixes materials to be bonded to each other with "quickness in seconds" in several to several 10 seconds. An adhesive in 7700 Series manufactured by ThreeBond Co., Ltd., serving as an instant adhesive can be "ThreeBond (registered trademark) 7741", for example. ThreeBond (registered trademark) 7741 includes 2-cyanoacrylateethyl as its main component, has a viscosity of about 2 mPas at the room temperature, for example, and is excellent in instant adhesiveness.

An ultraviolet radiation curing adhesive classified as one of electron radiation curing adhesives can be optical UV adhesives "NOA65", "NOA68", "NOA73", "NOA83H" manufactured by Norland Products Inc., in US, and the like, for example. The ultraviolet radiation curing adhesive such as the optical UV adhesive NOA65, NOA68, NOA73, or NOA83H is acrylic, and is a one-component ultraviolet radiation curing adhesive. An acrylic ultraviolet radiation curing adhesive is cured in a short time and is able to be cured in several seconds. The term "UV" means "ultraviolet". The term "Ultraviolet radiation" means an ultraviolet light. The ultraviolet radiation curing adhesive is referred to as "UV curing adhesive", etc.

NOA65 manufactured by Norland Products Inc., has a viscosity of about 1,000 to 1,200 cps (centipoise) at the room temperature, for example, has flexibility, and is able to bond a member to a delicate portion, for example. "1 cps" is converted into 1 mPas. NOA68 manufactured by Norland Products Inc., has a viscosity of about 5,000 cps at the room temperature, for example, has flexibility, and is able to bond a member to a delicate portion, for example. NOA73 manufactured by Norland Products Inc., has a viscosity of about 130 cps at the room temperature, for example, has flexibility and low viscosity, and is able to bond a member to a delicate portion by being thinly applied thereto, for example. NOA83H manufactured by Norland Products Inc., has a viscosity of about 250 cps at the room temperature, for example, also has heat curing property in addition to a UV property, and is also able to bond a portion that no light beam reaches, for example The ultraviolet radiation curing adhesive classified as one of electron radiation curing adhesives can be an adhesive in "OPTOCAST" Series, a product series name, manufactured by EMI in US, for example. A specific ultraviolet radiation curing adhesive can be "OPTOCAST3415" and "OPTOCAST3505-HM" manufactured by EMI in US, and the like. The ultraviolet radiation curing adhesives such as "OPTOCAST3415", "OPTOCAST3505-HM", etc., each are epoxy based and is a one-component ultraviolet radiation curing adhesive. An epoxy-based ultraviolet radiation curing adhesive has a low shrink property and high heat resistance and is excellent in chemical resistance and humidity resistance. By using a one-component ultraviolet radiation curing adhesive, which eliminate the work of mixing one liquid and another liquid executed when a two-component ultraviolet radiation curing adhesive is used. Consequently, a process of applying the adhesive is quickly and efficiently executed.

OPTOCAST3415 manufactured by EMI has a viscosity of about 100,000 cps at the room temperature, for example, and is securely cured by heating in addition to irradiation with a UV beam. OPTOCAST3505-HM manufactured by EMI has a viscosity of about 300 to 500 cps at the room temperature, for example, and is securely cured by heating in addition to irradiation with UV beam.

A viscosity of the adhesive during the bonding process is set to be equal to or higher than about 2 mPas, for example, and equal to or lower than 180,000 mPas at the room temperature and more specifically at 23° C.

When the viscosity of the adhesive is a high viscosity exceeding about 180,000 mPas at the room temperature and more specifically at 23° C., concern is that the adhesive does not spread substantially evenly over the portion to be applied with the adhesive.

Because of this, it is preferable that the viscosity of the adhesive for the bonding process is set to be equal to or lower than about 60,000 mPas, for example, at the room temperature and more specifically at 23° C. More preferably, the adhesive securely spreads over the portion to be applied with the adhesive by setting the viscosity of the adhesive to be equal to or lower than about 14,000 mPas, for example, at the room temperature and more specifically at 23° C. during the bonding process.

When the viscosity of the adhesive is a low viscosity lower than about 2 mPas at the room temperature and more specifically at 23° C., concern is that occurrence is the adhesive drops from the portion applied with the adhesive, etc., for example.

Preferably, the viscosity of the adhesive is set to be equal to or higher than about a viscosity of 250 mPas, for example, at the room temperature and more specifically at 23° C. when the bonding process is executed, and as a result, the adhesive, etc., tend not to occur so that the adhesive securely and widely stays in the portion applied with the adhesive.

More preferably, the viscosity of the adhesive is set to be equal to or higher than a viscosity of about 1,000 mPas, for example, at the room temperature and more specifically at 23° C. when the bonding process is executed, thereby facilitating that the adhesive, etc., is prevented from dropping so that the adhesive more securely stays in the portion applied with the adhesive.

After the diffraction grating 10 and the spring 30 for the diffraction grating are installed in the accommodating chamber 129 of the holder 120 for the diffraction grating of the housing 110 and the mounting position of the diffraction grating 10 is adjusted, the ultraviolet radiation curing adhesive classified as one of electron radiation curing adhesives is applied to a pair of upper end face portions 11a and 14a of the diffraction grating 10, the pair of folded-back portions 31b and 32b of the spring 30 for the diffraction grating, and a pair of upper end face portions 121 and 122 of the holder 120 for the diffraction grating. Thereafter, the ultraviolet radiation curing adhesive classified as one of electron radiation curing adhesives is irradiated with ultraviolet light classified as one of electron beams to cure the adhesive. As a result, the diffraction grating 10 and the spring 30 for the diffraction grating are accurately and elastically held in and fixed to the accommodating chamber 129 of the holder 120 for the diffraction grating of the housing 110.

Typical optical members located after the diffraction grating 10 will be described. The substantially convex OBLs 131 and 132 configured to condense the laser light beams (not depicted) onto the signal-surface portion Ma of the medium M such as an optical disc M are used as the optical members 131 and 132 composing the OPU 100. As such, the OPU 100 is configured including the plurality of OBLs 131 and 132 i.e., two or more, for example. More specifically, for example, the OPU 100 is configured including the OBL 132 having a numerical aperture of about 0.6 to 0.66 corresponding to the first laser wavelength light beam having a wavelength of about 765 to 840 nm and the second laser wavelength light beam having a wavelength of about 630 to 685 nm, and the OBL 131 having a numerical aperture of about 0.85 corresponding to the third laser wavelength light beam having a wavelength of about 340 to 450 nm. The term "numerical aperture" indicates a product of: a sine of an angle formed from an object point to the effective radius of an objective lens (the radius of the entrance pupil) of an optical instrument; and the refraction index of a medium on the incident side, for example. The numerical aperture is abbreviated as "NA". The numerical aperture is used to describe the performance of an objective lens.

The OPU 100 includes the pair of OBLs 131 and 132 configured to condense the laser light beam and apply and form an irradiation spot on the signal-surface portion Ma of the disc M. The OBL 131 is formed as a convex lens provided with a substantially convex curbed face on the inside of the OPU 100, for example. A face portion 131b on the top of the OBL 131 is formed in a substantially flat face, for example. However, the face portion 131b on the top of the OBL 131 may be formed in a substantially convex shape or a substantially concave shape, for example. The OBL 132 is formed as a convex lens formed provided with a substantially convex curbed face on the inside of in the OPU 100, for example. A face portion 132b on the top of the OBL 132 is formed in a substantially flat face, for example. However, the face portion 132b on the top of the OBL 132 may be formed in a substantially convex shape or a substantially concave shape, for example.

The laser light beam is focused on the signal-surface portion Ma of the optical disc M by moving upward and downward/rightward and the leftward the OBLs 131 and 132 of the OPU 100 using the actuator 190 of the OPU 100. More specifically, when a accurate laser light beam spot is formed by irradiation on the signal-surface portion Ma of the optical disc M, the OBLs 131 and 132 mounted on the lens holder 140 are moved substantially in directions such as a focusing direction D1 and a tracking direction D2, and, when necessary, in a tilt direction D4 by the actuator 190 of the OPU 100. The OPU 100 executes focusing adjustment and tracking adjustment, and, when necessary, tilt adjustment when the laser light beam is focused by the OBLs 131 and 132. The focusing adjustment, the tracking adjustment, and the tilt adjustment are substantially simultaneously executed, for example.

The "focus" means a focal point or focal point of a lens, for example. The "focusing" means bringing into focus or coming into focus. The "track" means a course for a signal on the optical disc M, for example. The "tracking" means to, using light beam, follow and observe micro signal portions provided on the signal-surface portion Ma of the optical disc M, thereby to determining the position of the course drawn in a substantially spiral shape. The "tilt" in an optical disc apparatus or an optical pickup apparatus means a deviation of an angle between the disc face and the optical axis of the objective lens.

For example, when focusing servo of the lens holder assembly 193 including the lens holder 140 mounted with the OBLs 131 and 132 is executed for the optical disc M, the lens holder assembly 193 including the lens holder 140 mounted with the OBLs 131 and 132 is moved in the up and down direction D1. When tracking servo of the lens holder assembly 193 including the lens holder 140 mounted with the OBLs 131 and 132 is executed for the optical disc M, the lens holder assembly 193 including the lens holder 140 mounted with the OBLs 131 and 132 is moved in the right and left direction D2 relative to the direction of the line of the substantially spiral track (not depicted) of the optical disc M, for example. The "servo" or a "servo mechanism" means a component having a mechanism to: measure the state of an object to be controlled; compare the measured value with a reference value; and automatically execute correction control. When the laser light beam condensed by the OBLs 131 and 132 is focused on the signal-surface portion Ma of the optical disc M, the lens holder assembly 193 including the lens holder 140 mounted with the OBLs 131 and 132 is driven upward and downward/rightward and leftward, etc., by the actuator 190.

In the OPU 100 depicted in FIGS. 1, 2, and 9, the pair of OBLs 131 and 132 are disposed in parallel to each other in the lens holder 140 substantially in the tracking direction D2, which is a direction substantially in one radial direction D2 of the optical disc M. However, depending on designs, specifications, etc., of the optical disc apparatus 1, the OPU 100, etc., the pair of OBLs 131 and 132 may be disposed in parallel to each other in the lens holder 140 substantially in a tangential direction D3 perpendicular to: the focusing direction D1, which is a direction substantially in the optical axis direction D1 of the OBLs 131 and 132; and the tracking direction D2, which is a direction substantially in the radial direction D2 of the optical disc M. One OBL may be mounted on the lens holder 140 in place of the plurality of OBLs 131 and 132.

As the optical member holding member 140 composing the OPU 100, the lens holder 140 composing the lens holder assembly 193 is used, including the plurality of OBLs 131 and 132, a plurality of coils 151, 151, 152, 152, 153, and 153, and a plurality of suspension wires 160/161, 162, 163, 164, 165, and 166.

The OPU 100 includes the synthetic-resin lens holder 140, including: one roof wall 141 in a substantially rectangular flat plate shape; and four side walls 142, 143, 144, and 145 in a substantially rectangular flat plate shape substantially perpendicular to the roof wall 141, and having a two-piece structure in a substantial rectangular box shape mounted with the two OBLs 131 and 132 on the substantially rectangular plate-like roof wall 141. For example, the front-and-back pair of side walls 142 and 145 in a substantially rectangular flat plate shape is faced each other in a substantially parallel manner, as well as the left-and-right pair of side walls 143 and 144 in a substantially rectangular flat plate shape is faced each other in a substantially parallel manner. The left-and-right pair of side walls 143 and 144 are positioned substantially perpendicular to the front-and-back pair of side walls 142 and 145, and the one roof wall 141 in a substantially rectangular flat plate shape substantially perpendicular to the side walls 142 to 145 is positioned on the top side of the side walls 142 to 145, thereby composing the lens holder 140 in a substantially rectangular box shape.

The focus/tilt coils 151 and 152, and the tracking coil 153 configured to drive the lens holder assembly 193 substantially in the directions D1, D2, and D4 by currents flowing through the coils are used as the coils 151, 152, and 153 composing the OPU 100.

The OPU 100 includes: the substantially rectangular ring-like fist focus/tilt coil 151; and the substantially rectangular ring-like second focus/tilt coil 152 disposed substantially in parallel to the substantially rectangular ring-like fist focus/tilt coil 151, the coils composing the differential actuator 190 configured to drive the lens holder 140 including the plurality of OBLs 131 and 132; the coils mounted in front-and-back and left-and-right pairs on substantially edge portions 146 and 147 of the substantially rectangular laterally-elongated flat plate-like side walls 142 and 145 facing each other of the lens holder 140 having a substantially rectangular box shape; and the coils configured to drive the lens holder 140 including the plurality of OBLs 131 and 132 substantially in the direction D1 of the optical axes of the OBLs 131 and 132 and substantially in the rocking direction D4. For example, a known focus coil and a known tilt coil are integrated, thereby configuring the first focus/tilt coil 151 serving both as the focus coil and as the tilt coil. For example, a known focus coil and a known tilt coil are integrated, thereby configuring the second focus/tilt coil 152 serving both as the focus coil and as the tilt coil.

Further, the OPU 100 includes the substantially rectangular ring-like tracking coils 153, the coils composing the differential actuator 190 configured to drive the lens holder 140 including the plurality of OBLs 131 and 132; the coils mounted in a front-and-back pair on substantially central portions 148 of the substantially rectangular laterally-elongated flat plate-like side walls 142 and 145 of the substantially rectangular box-like lens holder 140; the coils disposed substantially in a parallel manner between the substantially rectangular ring-like fist and the substantially rectangular ring-like second focus/tilt coils 151 and 152; and the coils configured to drive the lens holder 140 including the plurality of OBLs 131 and 132 substantially in the radial direction D2 of the optical disc M.

Further, for example, the substantially linear suspension wires 161 to 166 having a small diameter are used as the supporting members 161 to 166 configured to support the lens holder assembly 193 including the optical members 131 and 132 and composing the OPU 100, such that the assembly 193 is movable in its suspended state, for example.

The OPU 100 includes the plurality of substantially linear elastic supporting members 161 to 166, so-called substantially linear suspension wires 161 to 166, the members provided on the lens holder assembly 193 in the substantially rectangular box-like shape, and elastically supporting the lens holder assembly 193. For example, the substantially linear suspension wires 161 to 166 composing the OPU 100 are provided extending substantially in the tangential direction D3 perpendicular to: the focusing direction D1, substantially along the optical axes direction D1 of the OBLs 131 and 132; and the tracking direction D2, substantially along the radial direction D2 of the optical disc M. Depending on rotation positions, etc., of the optical disc M, for example, the tangential direction D3 is another radial direction D3 of the optical disc M. An electric current as a driving signal, a control signal, etc., is passed through at least four on the left and the right or, preferably, the six on the left and the right suspension wires 161 to 166 out of the six on the left and the right suspension wires 161 to 166 mounted on the lens holder assembly 193 of the OPU 100, thereby passing an electric current as the driving signal, the control signal, etc., through at least four coils or, preferably, the six coils 151, 151, 152, 152, 153, and 153 mounted on the lens holder assembly 193 of the OPU 100 and connected in an electrically conductive manner to the suspension wires 161 to 166.

For example, substantially rectangular parallelepiped magnets each generating magnetism/magnetic force by themselves, so-called magnets 171 and 176 are used as the magnetic members 171 and 176 composing the OPU 100.

For example, used is one two-pole driving magnet 171 having a positive pole 174*a* formed in one portion 173*a* of one face 172 and a negative pole 174*b* formed on the other portion 173*b* of the one face 172. For example, used is one two-pole driving magnet 176 having a positive pole 179*a* formed in one portion 178*a* of one face 177 and a negative pole 179*b* formed on the other portion 178*b* of the face 177. Depending on the mounting structure of the magnets 171 and 176, design/specification, etc., of the OPU 100, for example, one-pole/two-pole magnets or multi-pole magnetized magnets having two or more poles magnetized therewith may be used as the magnetic members 171 and 176.

For example, a complicatedly structured frame/yoke 180 provided with the magnetic members 171 and 176, etc., is used as the fixing members 180 composing the OPU 100. The frame/yoke 180 includes: a base wall portion 182; a pair of side wall portion 183 and 184 formed by being folded at a substantially right angle relative to the base wall portion 182 and extending therefrom; and a roof wall 181 formed by being folded at a substantially right angle relative to the pair of side wall portions 183 and 184 and extending therefrom as well as formed substantially in parallel to the base wall portion 182, and the frame/yoke is configured to surround the substantially rectangular parallelepiped magnets 171 and 176.

The OPU 100 includes the fixing member 180, i.e., the frame/yoke 180, for example, mounted with at least two, preferably, four, more preferably, six of the substantially rectangular flat plate-like magnets 171 and 176. The fixing member 180 is configured as the frame/yoke 180, for example. The term "frame" means a basic structure, a framework, or a bony structure, for example. The term "yoke" means one that structurally supports magnetic coupling, for example. Further, the "yoke" is one that reduces magnetic force leakage generated from a magnetic member such as a magnet. The frame/yoke is formed as a frame having the function as a yoke. Here, for example, a magnetic coupling member or a back yoke provided with the magnets 171 and 176 is used as the frame/yoke 180. For example, the magnetic coupling member or the back yoke is handled as the frame/yoke 60.

The OPU 100 includes a light-receiving element, so-called photodetector or PDIC (Photodiode IC) or PD (Photodetector) (not depicted) configured to receive the laser light beam reflected from the signal layer Ma of the optical disc M. The PD not depicted at least includes three light-receiving units: a substantially rectangular, viewed from above, main light-receiving unit (not depicted) supporting the main beam (zero order light beam) having passed through the diffraction grating 10 divided into a plurality of parts, such as quadrisected type one; and a pair of substantially rectangular, viewed from above, sub light-receiving units (not depicted) supporting the pair of sub-beams (±first order diffracted light fluxes) diffracted and split by passing through the diffraction grating 10. The substantially rectangular, viewed from above, main light-receiving unit is divided into substantially equal four parts, and includes the substantially rectangular, viewed from above, four segments. The substantially rectangular, viewed from above, sub light-receiving units each are divided into substantially equal four parts, and include the substantially rectangular, viewed from above, four segments. As such, the PD including the multiple-divided light-receiving units each including a plurality of substantially rectangular, viewed from above, segments are provided in the OPU 100. The term "segment" means one of some parts obtained by dividing the whole into those parts such as components, fragments, etc., for example.

The PD is one configured to: receive a laser light beam reflected from the signal layer Ma of the optical disc M; convert the received signal into an electric signal; and detect data, information, or a signal recorded in the signal layer Ma of the optical disc M. The PD is one configured to: receive the laser light beam reflected from the signal layer Ma of the optical disc M; convert the received signal into an electric signal; and operate the servo mechanism of the lens holder assembly 193 including the lens holder 140 with the OBLs 131 and 132 composing the OPU 100. When the OPU 100 reads the data/information/a signal recorded in the optical disc M, writes data/information/a signal into the optical disc M, or erases data/information/a signal recorded in the optical disc M, for example, the light-receiving units of the PD are irradiated with the laser light beams, thereby detecting a main information signal of the optical disc M, and the focusing error signal, the tracking error signal, etc., for the optical disc M.

The OPU 100 includes a damping material (not depicted) in a substantially gel state, for example, for suppressing abnormal vibrations, etc., generated in the suspension wires 161 to 166, for example, and a damping holding member 197 for holding the damping material. The suspension wires 161 to 166 are inserted through the holes (not depicted) of the damping holding member 197 attached on the back side of the frame/yoke 180. The holes not depicted of the damping holding member 197 through which the suspension wires 161 to 166 are inserted are filled with a damping material, so-called damping agent, formed of a synthesized polymer rich in flexibility.

The OPU 100 includes a circuit board 199 attached thereto electrically connecting the suspension wires 161 to 166 in a conductive manner. The circuit board is referred to as "PWB (Printed Wired/Wiring Board)", for example.

Depending on designs/specifications, etc., of the optical disc apparatus 1, the OPU 100, etc., the OPU 100 includes a covering member (not depicted), such as a covering plate, configured to protect the various components of the OPU 100. When the OPU 100 is assembled, the covering plate not depicted configured to protect the various components, for example, is provided on the top of the OPU 100.

Further, the OPU 100 includes the housing 110 (FIGS. 1 and 2) accommodating various optical components, electric components, driving components, etc. The "housing" means a box, a box-like component, or one similar to a box accommodating items such as a device and a component, for example.

The optical components accommodated in the housing 110 can be a laser diode (LD), a half-wave plate (half-$\lambda$ plate), an aperture-limited wideband quarter-wave plate (quarter $\lambda$ plate), a liquid crystal correcting element (LCD: Liquid Crystal Device/Display), a diffractive optical element (DOE), a diffraction grating (in-line grating), a divergent lens, a prism, a polarization beam splitter, a dichroic filter, a collimator lens, a beam expander lens, a semitransparent mirror, a reflecting mirror, a total reflection mirror, an objective lens, a front monitor diode, a sensor lens, an anamorphic lens, an intermediate lens, and a photodetector. The OPU 100 includes the above described optical components, for example.

The electric components accommodated in the housing 110 can be a printed circuit board, a memory device (ROM: Read-Only Memory), a suspension wire, a coil, an actuator, a flexible printed circuit body, a connector, a laser driver, a laser diode, a liquid crystal correcting element, a beam expander unit including a collimator lens, etc., a front monitor diode, and a photodetector, for example. The OPU 100 includes the above described electric components.

The driving components accommodated in the housing 110 can be a suspension wire, a coil, a magnet, a yoke, an actuator, an objective lens, a lens holder, and a beam expander unit including a collimator lens, etc. The OPU 100 includes the above described driving components, for example.

The various components, such as the various optical components, electric components, and driving components, composing the OPU 100 are accommodated in the housing 110. The housing 110 includes: a housing main body 115 accommodating the various components, such as the various optical components, electric components, driving components; a pair of main shaft bearing portions 111a and 111b provided protruding from the housing main body 115 and brought into movable contact with the first support 91 that is a first shaft member; and a sub shaft bearing 112 provided protruding from the housing main body 115 toward the opposite side of the main shaft bearings 111a and 111b and brought into movable contact with the second support 92 that is a second shaft member. The main shaft bearings 111a and 111b, and the sub shaft bearing 112 are integrally formed with the housing main body 115. The main shaft bearings 111a and 111b, the sub shaft bearing 112, and the housing main body 115 are integrally formed as one component.

When the OPU 100 moves substantially in the longitudinal direction D2 of the substantially round bar-like supports 91 and 92, the substantially round hole-like first bearing 111a and the substantially round bar-like first support 91 slidably contact each other. When the OPU 100 moves substantially in the longitudinal direction D2 of the substantially round bar-like supports 91 and 92, the substantially round hole-like second bearing 111b and the substantially round bar-like first support 91 slidably contact each other. When the OPU 100 moves substantially in the longitudinal direction D2 of the substantially round bar-like supports 91 and 92, the third bearing 112 having a sliding bearing structure in a substantially U-shape on its side and the substantially round bar-like second support 92 slidably contact each other. The longitudinal direction D2 of the substantially round bar-like supports 91 and 92 is set to be the direction D2 for the OPU 100 to move from the inner circumferential side to the outer circumferential side of the optical disc M and/or from the outer circumferential side to the inner circumferential side of the optical disc M.

The supports 91 and 92 are formed as sliding shafts 91 and 92 capable of slidably contacting the bearings 111a, 111b, and 112 of the housing 110 of the OPU 100, for example. The supports 91 and 92 are formed using "hot finished stainless steel bars" excellent in corrosion resistance and specified based on "JIS G 4304", "cold forming stainless steel bars" specified based on "JIS G 4318", etc., for example. The bearings 111a, 111b, and 112 are formed as the sliding units 111a, 111b, and 112, for example, capable of slidably contacting the sliding shafts 91 and 92.

The OPU 100 is movably supported with a stable substantially three-point structure on the pair of sliding shafts 91 and 92 by the first, the second, and the third sliding units 111a, 111b, and 112 of the housing 110. The OPU 100 is movably supported on the pair of sliding shafts 91 and 92 at the main three points of the first, the second, and the third sliding units 111a, 111b, and 112 of the housing 110, thereby reducing more friction as compared to that in an OPU (not depicted) having a four-point supporting structure, for example.

The third sliding unit 112 configures the opened sliding bearing structure having a substantial U-shape on its side, thereby easily performing the work of assembling the OPU 100 to the sliding shaft 92 used as the sub shaft, for example. Further, since the third sliding unit 112 configures the opened sliding bearing structure having a substantial U-shape on its side, a slight error such as the degree of parallelism of the second sliding shaft 92 used as the sub shaft relative to the first sliding shaft 91 used as the main shaft, for example, is absorbed by the third sliding unit 112 of the opened sliding bearing structure having a substantial U-shape on its side.

The OPU 100 includes: the lens holder assembly 193 having the OBLs 131 and 132 and the coils 151 to 153; the suspension wires 161 to 166; the magnets 171 and 176; and the frame/yoke 180. Though the OPU 100 includes components, etc., other than the above various components, other components, etc., will not be described in detail.

The pickup apparatus main unit assembly 7 composing the traverse mechanism 5 includes: the substantially flat plate-like chassis 80; the pair of long round bar-like sliding shafts 91 and 92 attached to the substantially plate-like chassis 80; and the OPU 100 movably mounted on the pair of long round bar-like sliding shafts 91 and 92. The OPU 100 also includes the pair of OBLs 131 and 132, using which the signal-surface portion Ma of the disc M is irradiated with a laser light beam, etc., in a light-focused manner.

By using the adhesive, etc., the substantially flat plate-like circuit board 60 composing the rotary motor main unit assembly 50 is mounted on the substantially flat plate-like chassis 80 composing the optical pickup apparatus main unit assembly 7, and the pair of substantially round bar-like sliding shafts 91 and 92 are mounted on the substantially flat plate-like chassis 80, thereby configuring the highly accurate traverse mechanism 5 in which components is hardly misaligned and the optical disc apparatus 1 including the traverse mechanism 5, etc.

The optical disc apparatus 1 including the OPU 100 and the traverse mechanism 5: is usable in a recording and reproducing apparatus, for example, configured to record data, information, a signal, etc., in the above various types of optical discs M, reproduces data, information, a signal, etc., in the various types of optical discs M, or erases data, information, a signal, etc., in the various types of optical discs M. Further, the optical disc apparatus 1 including the OPU 100 and the traverse mechanism 5 is also usable in a reproducing only apparatus, for example, configured to reproduce data, information, a signal, etc., of the various types of optical disc M.

An OPU mounted with one OBL 131 or 132, for example, may be used in place of the OPU 100 mounted with the two OBLs 131 and 132.

Description will be given of a state where the disc M is loaded in the optical disc apparatus 1. The disc M is loaded in an optical disc apparatus main body 2 of the optical disc apparatus 1 using a tray (not depicted) capable of being ejected from and retracted into the optical disc apparatus main body 2 of the optical disc apparatus 1.

The optical disc apparatus 1 (FIGS. 1, 2, and 9) is configured to capable of loading the optical disc M, and includes: the tray (not depicted) capable of being ejected from and retracted into the optical disc apparatus main body 2; a clamping unit including the turn table 73 (FIGS. 2 and 9) and a clamper (not depicted) facing the turn table 73, and capable of fixing the optical disc M by sandwiching the optical disc M therebetween; the driving unit 40 including the turn table 73 and configured to drive and rotate the optical disc M; the OPU 100 configured to irradiate the optical disc M with the laser light beams; and the pair of sliding shafts 91 and 92 configured to movably support the OPU 100 when the OPU 100 is moved in the radial direction D2 of the optical disc M.

The optical disc M is loaded in the optical disc apparatus 1 using the tray in a substantial plate shape capable of ejected from and retracted into a substantially rectangular box-like cabinet 3 (FIG. 9), so-called cover 3, composing the optical disc apparatus 1. The driving unit 40 (FIGS. 2 and 9) configured to rotate the optical disc M is accommodated in the cover 3 composing the optical disc apparatus 1. The disc driving unit 40 including the substantially round plate-like turn table 73 to be loaded with the optical disc M is used as the driving unit 40. The OPU 100 configured to read data/information/a signal in the optical disc M, record data/information/a signal into the optical disc M, and erase data/information/a signal in the optical disc M is accommodated in the cover 3 composing the optical disc apparatus 1. The optical disc apparatus 1 is assembled by attaching an upper cover (not depicted) to the lower cover 3 provided with the various types of components.

The optical disc M having a round hole Mb formed in its central portion Mc is demountably fixed securely sandwiched in a state of being positioned between the turn table 73 and the clamper using the clamping unit provided with the turn table 73 and the clamper facing the turn table 73.

The optical disc apparatus 1 is the optical disc apparatus 1 for a desktop personal computer (PC), including the OPU 100 for desktop personal computer (PC), for example. Although the optical disc apparatus 1 includes components, etc., other than the above various types of components, other components, etc., will not be described in detail.

Second Example

Description will be given in detail of an elastic member, a mounting structure of an optical element, and a pickup apparatus having the same according to a second embodiment of the present invention, with reference to the drawings.

An elastic member 30, a mounting structure of the optical element 10X, a pickup apparatus 100X having the same, and a disc apparatus depicted in FIGS. 10 to 16 are partially different from the elastic member 30, the mounting structure of the optical element 10, the pickup apparatus 100 having the same, and the disc apparatus 1 depicted in FIGS. 1 to 9. The same member is used as the elastic members 30 in first and second embodiments. In a second embodiment of the present invention, components equivalent to those described in a first embodiment will be given the same reference numerals and will not be described in detail.

The pickup apparatus 100X includes one objective lens 133 supporting the laser light beams having the above various wavelengths.

Figure 13:
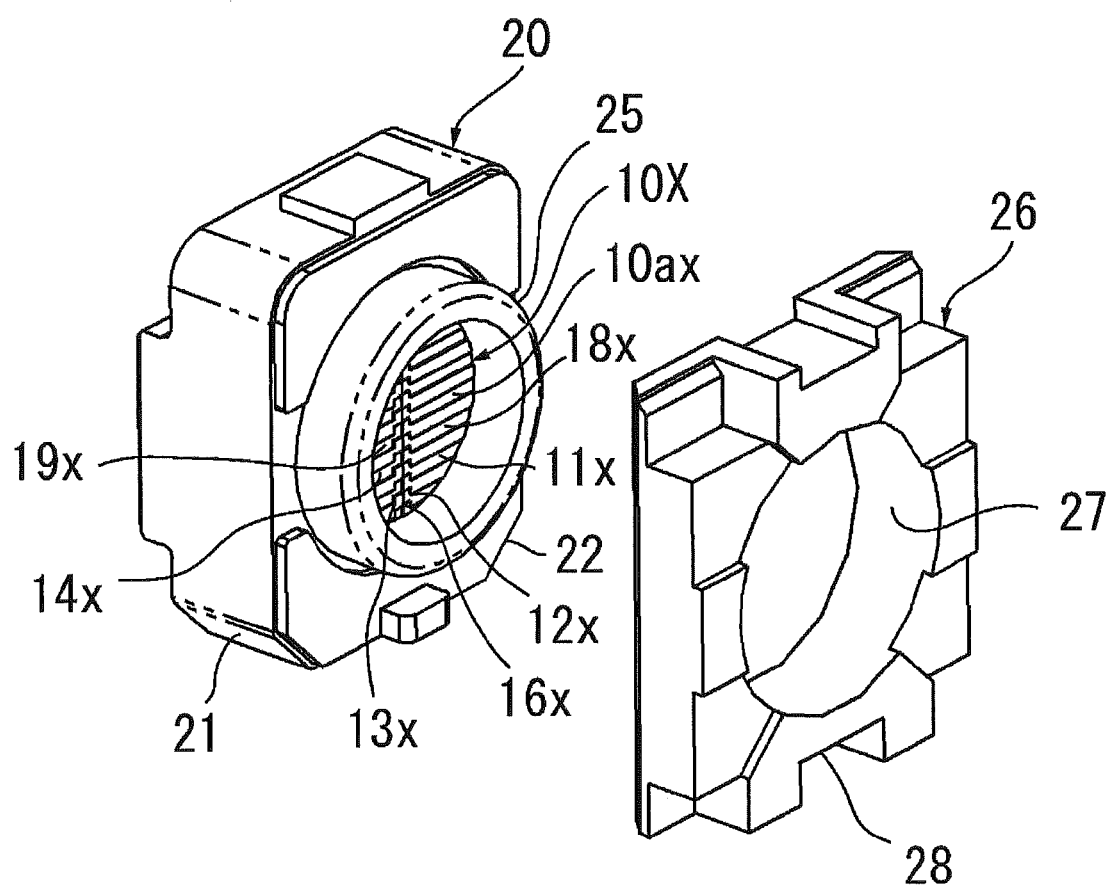
FIG. 13 is a perspective view of an optical element and a holding member configuring a mounting structure of an optical element.
Figure 14:
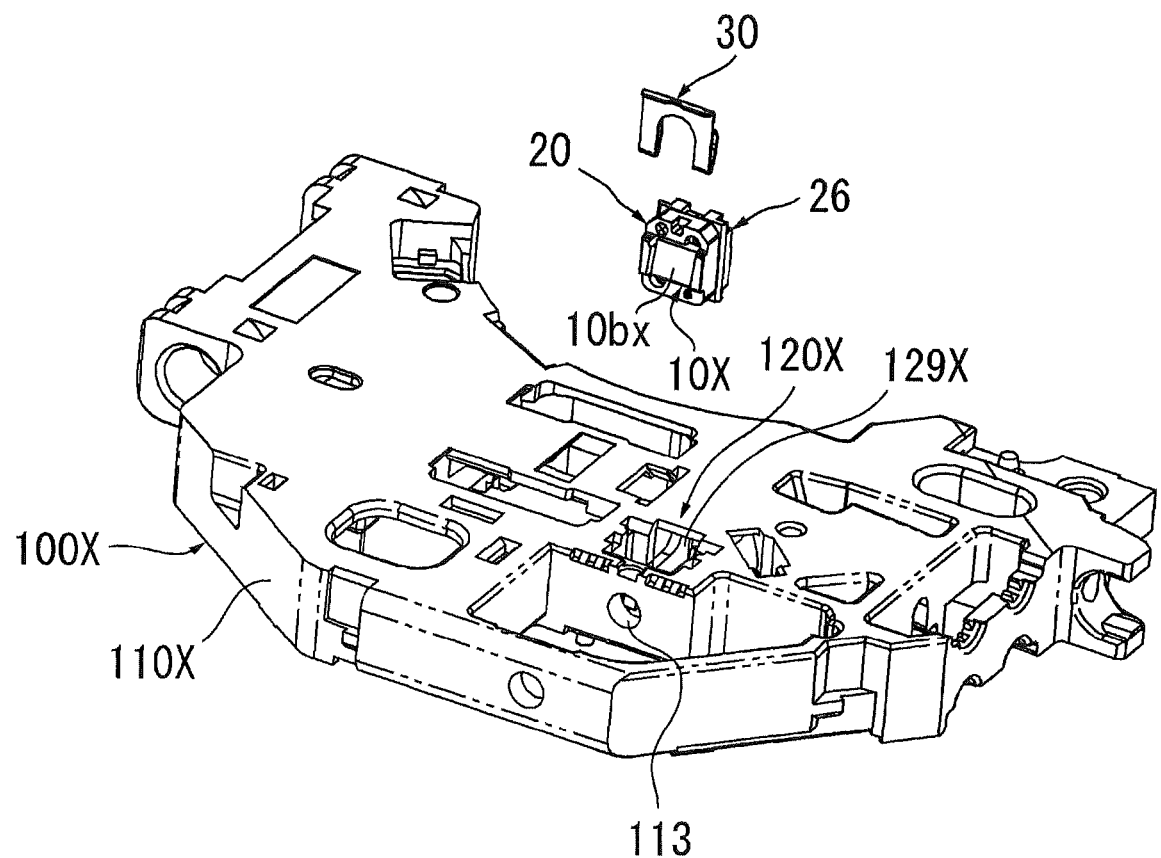
FIG. 14 is a perspective view of an optical element, an elastic member, and a holding unit configuring a mounting structure of an optical element, and a pickup apparatus.
Figure 15:
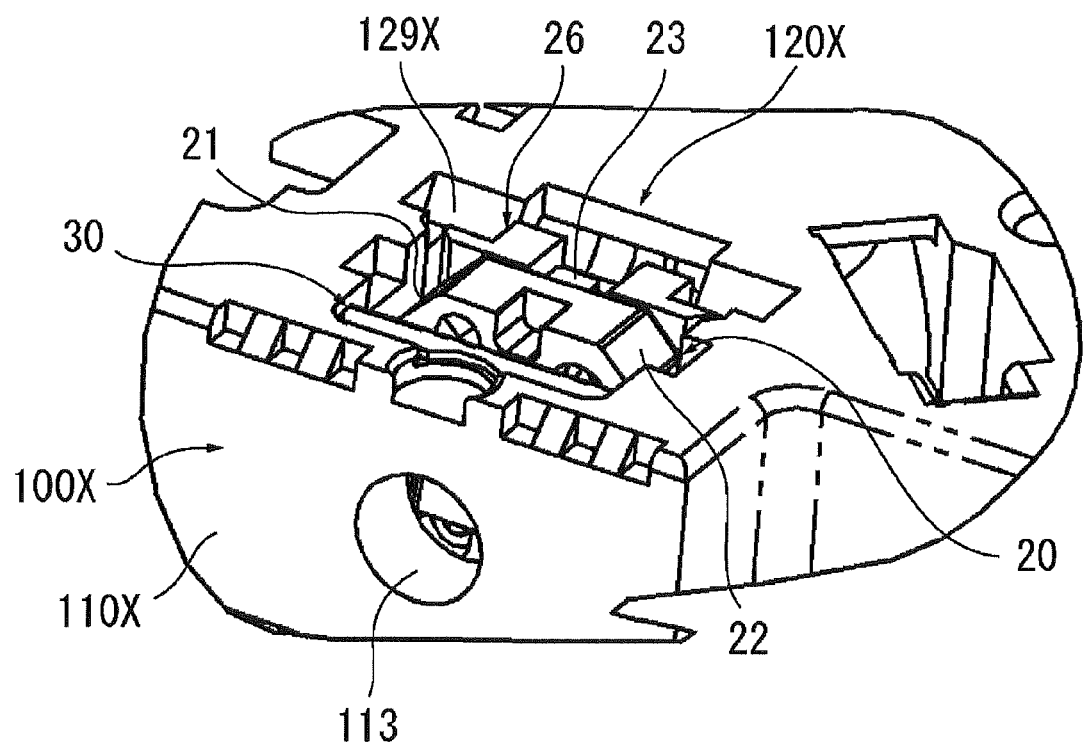
FIG. 15 is an enlarged perspective view of a state where an optical element, an elastic member, and a holding member depicted in FIG. 14 are mounted on a holding unit.
Figure 16:
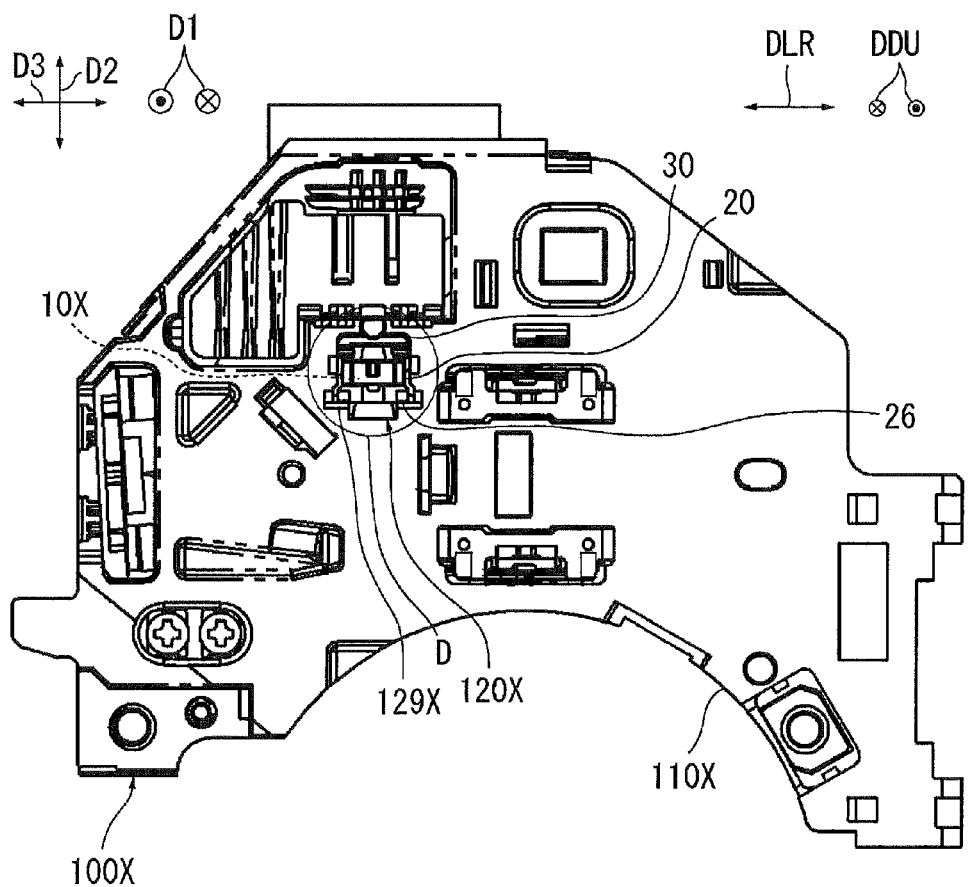
FIG. 16 is a plan view of a mounting structure of an optical element in which an optical element, an elastic member, and a holding member are mounted onto a holding unit, and a pickup apparatus.
Figure 17:
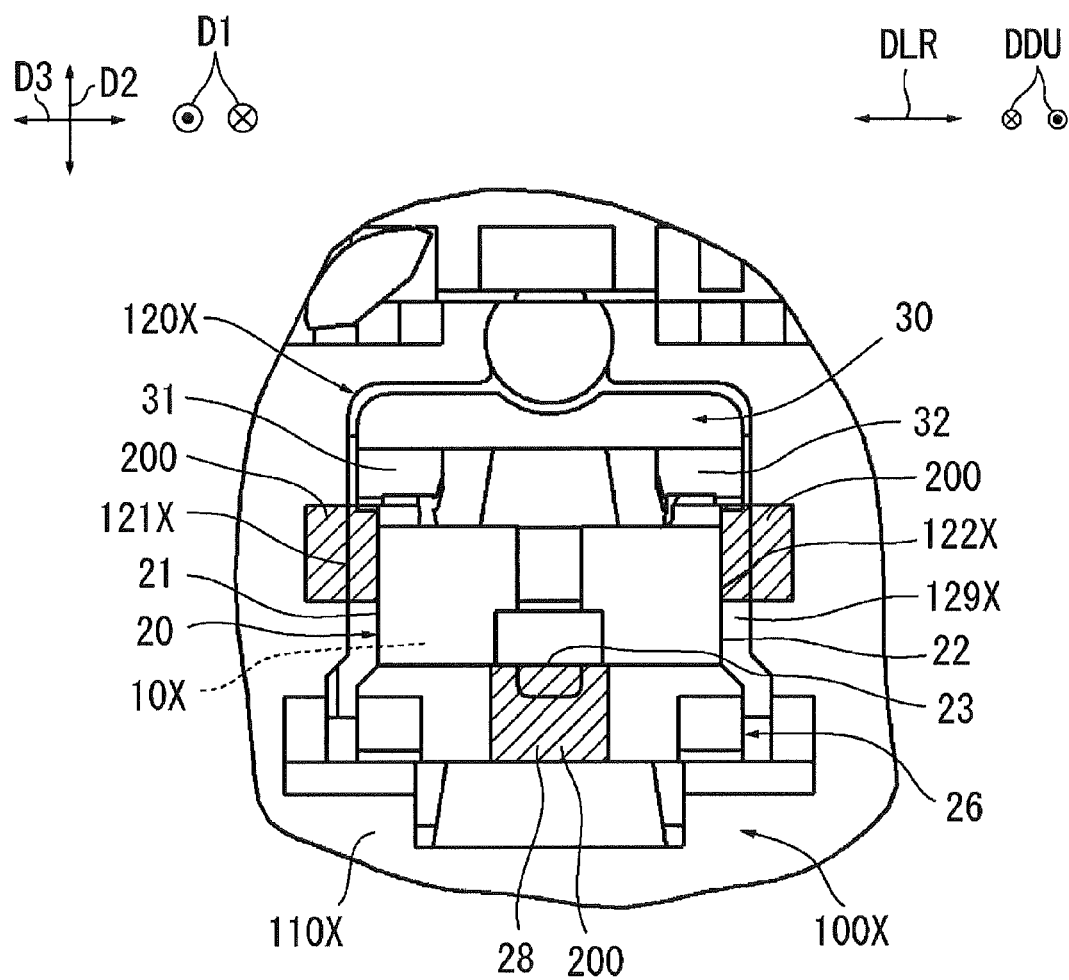
FIG. 17 is an enlarged explanatory diagram of a mounting structure of an optical element in which an optical element, an elastic member, and a holding member are mounted onto a holding unit using a joining member, etc., and a pickup apparatus, in a principal part D depicted in FIG. 16.

The mounting structure of the optical element 10X includes: the optical element 10X (FIGS. 11, 12, and 13); a holding member 20 mounted with the optical element 10X; the elastic member 30 (FIGS. 3, 4, and 14) used when the holding member 20 including the optical element 10X is mounted; and a holding unit 120X (FIGS. 14 to 17) mounted with the optical element 10X, the holding members 20 and 26 (FIG. 13), and the elastic member 30 (FIG. 14). The elastic member 30 is pressed into the holding unit 120X and the holding members 20 and 26 including the optical element 10X are mounted on the holding unit 120X using the elastic member 30.

The optical element 10X is formed in a substantially rectangular light-transmittable plate shape viewed from the front. Corresponding to the optical element 10X, the elastic member 30 is formed in a light-transmittable substantial concave shape viewed from the front.

The holding unit 120X is formed using resin. The elastic member 30 is formed using metal.

The diffraction grating 10X is configured to divide an incident light beam into a plurality of light beams. The first- and the second-wavelength laser light beams emitted from the LD each are divided into at least three light beams of a main beam (zero order light beam) and two sub-beams (±first order diffracted light fluxes) by the optical element 10X, so-called diffraction grating 10X, configured to be divided into a plurality of regions 11X, 12X, 13X, and 14X such as quadrisected.

When the optical element 10X is mounted on the holding unit 120X, the holding member 20 mounted with the optical element 10X is mounted on the holding unit 120X by the elastic member 30 mounted together with the holding unit 120X. Since the elastic member 30 is pressed into the holding unit 120X, it is avoided that the elastic member 30 is inadvertently displaced, which results in inaccurate position adjustment of the holding member 20 including the optical element 10X, when adjusting the attachment position of the holding member 20 including the optical element 10X mounted together with the elastic member 30 on the holding unit 120, for example. Thus, the holding member 20 including the optical element 10X is able to accurately be mounted on the holding unit 120X.

The elastic member 30 is configured to be used when mounting the holding member 20 including the optical element 10X on the holding unit 120X with the holding member 20 aligned therewith. The elastic member base portion 33 is provided with the press-fitting fixing portions 36 and 37 for positioning and fixing to the holding unit 120X.

The elastic member base portion 33 is formed in a substantial plate shape. The press-fitting fixing portions 36 and 37 are configured to be protruding portions 36 and 37 protruding on the left and the right side portions 33L and 33R, viewed from the front, of the elastic member base portion 33.

The press-fitting fixing portion 36 includes inclined face portions 36a and 36b enabling the elastic member base portion 33 to be detachably mounted on the holding unit 120X. The press-fitting fixing portion 37 has inclined face portions 37a and 37b enabling the elastic member base portion 33 to be detachably mounted on the holding unit 120X.

The abutting force generating units 31 and 32 are provided extending from the elastic member base portion 33 and generate restoring elastic force against the holding members 20 and 26 including the optical element 10X, and the holding unit 120X.

The abutting force generating units 31 and 32 are folded back with respect to the elastic member base portion 33.

In this mounting structure of the optical element 10X, the elastic member 30 according to the above embodiment is used as the elastic member 30.

When mounting the holding member 20 including the optical element 10X onto the holding unit 120X while aligning the optical element 10X with the holding unit 120X, the holding member 20 including the optical element 10X is mounted on the holding unit 120X using the elastic member 30 hat is mounted on the holding unit 120X. Since the press-fitting fixing portions 36 and 37 for positioning and fixing to the holding unit 120X are included in the elastic member base portion 33, it is avoided that the elastic member 30 is inadvertently displaced, which results in inaccurate position adjustment of the holding member 20 including the optical element 10X, when adjusting the position of the holding member 20 including the optical element 10X mounted together with the elastic member 30 on the holding unit 120X. The holding member 20 including the optical element 10X is able to be accurately mounted on the holding unit 120X.

The protruding portions 36 and 37 are provided on the left and the right side portions 33L and 33R, viewed from the front, of the elastic member base portion 33 of the elastic member 30. This enables lateral alignment executed when the elastic member 30 is mounted on the holding unit 120X, as well as prevention of occurrence of lateral displacement of the elastic member 30 when the holding member 20 including the optical element 10X is moved in the left and right directions DLR from the initial mounted position, by position adjustment of the holding member 20 including the optical element 10X. As a result, the contact position between the holding member 20 including the optical element 10X and the elastic member 30 is always stabilized. Accordingly, the stability, the reliability, etc., are able to be improved of the initial performance of the mounting structure of the optical element 10X.

Taking into consideration mounting and demounting of the holding member 20 including the elastic member 30 and/or the diffraction grating 10X onto/from the holding unit 120X for attaching and repairing, the inclined face portions 36a and 36b/37a and 37b are formed on the press-fitting fixing portions 36/37 of the left and the right side portions 33L/33R, viewed from the front, of the spring base portion 33 composing the elastic member 30, thereby being able to easily demountably mount the elastic member 30 onto the holding unit 120X.

The inclined face portions 36a and 36b/37a and 37b are respectively formed on the press-fitting fixing portions 36/37 of the left and the right side portions 33L/33R, viewed from the front, of the spring base portion 33 composing the elastic member 30, and the press-fitting fixing portions 36/37 in a substantially tapered shape, for example, are provided on the left and the right side portions 33L/33R, viewed from the front, of the spring base portion 33. As a result, when the elastic member 30 is mounted on the holding unit 120X, the metal spring 30 digs into the resin holding unit 120X, thereby being able to expect an effect of preventing misalignment of the elastic member 30 with respect to the holding unit 120X.

The pickup apparatus 100X includes the mounting structure of the above optical element 10X.

If the mounting structure of the optical element 10X is configured, the holding member 20 including the optical element 10X is mounted on the holding unit 120X using the elastic member 30 at a position accurately adjusted. Thus, the pickup apparatus 100X excellent in optical characteristics is able to be configured.

The elastic member, the method for mounting the optical element, and the method for assembling the pickup apparatus will be described in detail. The OPU 100X having the mounting structure of the optical element 10X includes: the optical element 10X configured to divide an incident laser light beam into a plurality of laser light beams; one holding member 20 configured to be provided with the optical element 10X; the other holding member 25 configured to be mounted on the one holding member 20; the elastic member 30 for the optical element and the holding member used when the one holding member 20 configured to be provided with the optical element 10X and the other holding member 25 configured to be mounted on the one holding member 20 are accurately aligned with and mounted on the holding unit 120X for the optical element and the holding member of a housing 110X; and the holding unit 120X for the optical element and the holding member having a accommodating portion 129X in which the optical element 10X and the elastic member 30 for the optical element and the holding member is inserted to be provided.

The optical element 10X is formed as a diffraction grating 10X, so-called grating, in a substantially rectangular plate shape viewed from the front, configured to divide an incident laser light beam into a plurality of laser light beams to emit the laser light beams. More specifically, the optical element 10X is formed as a diffraction grating 10X, so-called grating, in a substantially parallelogram shape viewed from the front, configured to divide an incident laser light beam into a plurality of laser light beams to emit the laser light beams. A spring 30 for the diffraction grating and the holder is used as the elastic member 30 for the optical element and the holding member. The holding unit 120X for the diffraction grating and the holder is used as the holding unit 120X for the optical element and the holding member. A fist holder 20 is used as the first holding member 20 composing the one holding member 20. A second holder 26 is used as the second holding member 25 composing the other holding member 25. A substantially rectangular box-like accommodating chamber 129X having a substantially concave shape, viewed from the front, composing the holding unit 120 for the diffraction grating and the holder is used as the accommodating portion 129X composing the holding unit 120X for the optical element and the holding member.

The spring 30 for the diffraction grating and the holder is pressed into and detachably fixed to the accommodating chamber 129X of the holding unit 120X for the diffraction grating and the holder, as well as, when the first holder 20 provided with the diffraction grating 10X and the second holder 26 is installed in the accommodating chamber 129X of the holding unit 120X for the diffraction grating and the holder, restoring elastic force is generated in the bent elastic bending parts 31 and 32 of the spring 30 for the diffraction grating and the holder, thereby accurately elastically holding and providing the first holder 20, provided with the diffraction grating 10X and the second holder 26, in the accommodating chamber 129X of the holding unit 120X for the diffraction grating and the holder, in a state where the attachment position thereof is adjustable substantially in the left and right directions DLR and/or the up and down directions DDU and/or the rotational direction.

The diffraction grating 10X is transparent or translucent allowing light to pass therethrough, formed in a substantially rectangular plate shape viewed from the front. Corresponding to the diffraction grating 10X, the spring base portion 33 of the spring 30 for the diffraction grating and the holder is formed in a substantial concave shape viewed from the front, such that the laser light beam can pass by without being applied thereto. A substantially semi-ellipse-like laser light transmission part 35 is formed in the spring base portion 33 of the spring 30 for the diffraction grating, by cutting a substantially semi-ellipse-like portion off from the spring base portion 33 of the spring 30 for the diffraction grating and the holder. For example, the spring base portion 33 of the spring 30 for the diffraction grating and the holder is formed by cutting the portion off in the semi-ellipse-like manner, in order to correspond to a diffraction grating adjusting hole 113 of the housing 110X as well as to avoid interference of the laser light beam with the elastic bending parts 31 and 32 of the spring 30 for the diffraction grating and the holder, in an laser light optical path, and further to avoid occurrence of significant degradation in strength of the spring 30 for the diffraction grating and the holder. In order to avoid the interference of the laser light beam with the elastic bending parts 31 and 32 in a state of being bent, for example, when the spring 30 for the diffraction grating and the holder is seen from the front, the widths of the elastic bending parts 31 and 32 are gradually narrowed from folded-back portions 31b and 32b, which substantially correspond to the basal portion portions of the elastic bending parts 31 and 32, to substantially semicircular tip portions 31a and 32a.

Corresponding to the diffraction grating 10X, the holding unit 120X for the diffraction grating and the holder is formed in a substantially concave shape such that the laser light beam can pass by without being applied thereto.

The holding unit 120X for the diffraction grating and the holder is formed using synthetic resin. The spring 30 for the diffraction grating and the holder including the protruding portion-like press-fitting fixing portions 36 and 37, the elastic bending parts 31 and 32, and the spring base portion 33, is formed using metal. The diffraction grating 10X is formed using a synthetic resin or glass.

The housing 110X composing the OPU 100X and including the holding unit 120X for the diffraction grating and the holder is formed using a thermal-resistant synthetic resin composite with a base material of a PAS-based resin such as PPS resin that is excellent in mechanical properties, sliding properties, dimensional stability, thermal resistance, injection-molding properties, electric properties such as an insulating properties, etc., and that enables reduction of its weight compared to an iron material, for example. The resin material is a material of smaller specific gravity than that of iron material, for example, and suitable for weight reduction. For example, since a synthetic resin material such as PAS or PPS is generally softer than a steel-base metal material, the protruding portions 36/37 of the left and the right side portions 33L/33R, viewed from the front, of the spring base portion 33 composing the spring 30 for the steel-base metal diffraction grating dig into the holding unit 120X for the diffraction grating and the holder of the resin hosing 110X when the spring 30 for the diffraction grating is mounted onto the holding unit 120X for the diffraction grating and the holder of the housing 110X.

Otherwise, the housing 110X composing the OPU 100X is formed using a metal such as a non-ferrous metal or a die-casting alloy that includes at least one or more kind(s) of element selected from a group including aluminum (Al), magnesium (Mg), and zinc (Zn), for example. Aluminum, magnesium, and zinc are recognized to be excellent in corrosion resistance and also recognized to be non-ferrous metals of a specific gravity smaller than that of iron. The housing 110X is formed using non-ferrous metal material such as aluminum alloy mainly including aluminum, for example. For example, since a non-ferrous metal material such as aluminum alloy mainly including aluminum is generally softer than a steel-base metal material, the protruding portions 36/37 of the left and the right side portions 33L/33R, viewed from the front, of the spring base portion 33 composing the steel spring 30 for the diffraction grating dig into the holding unit 120X for the diffraction grating and the holder of the aluminum hosing 110X when the spring 30 for the diffraction grating is mounted onto the holding unit 120X for the diffraction grating and the holder of the housing 100X.

The spring 30 for the diffraction grating and the holder is configured as the spring 30 for the diffraction grating and the holder used when the first holder 20, provided with the diffraction grating 10X and the second holder 26, is accurately aligned with and installed in the accommodating chamber 129X of the holding unit 120X for the diffraction grating and the holder of the housing 110X. The press-fitting fixing portions 36 and 37 for positioning and fixing to the holding unit 120X for the diffraction grating and the holder are provided on the spring base portion 33 composing the spring 30 for the diffraction grating and the holder.

Further, the spring base portion 33 of the spring 30 for the diffraction grating and the holder is formed in a substantially plate shape in a substantially rectangular concave shape viewed from the front. The press-fitting fixing portions 36 and 37 of the spring 30 for the diffraction grating and the holder are formed as the pair of protruding portions 36 and 37 protruding in a substantially trapezoidal shape on the left and the right side portions 33L and 33R, viewed from the front, of the spring base portion 33, respectively.

Further, the press-fitting fixing portions 36/37 of the spring 30 for the diffraction grating and the holder are formed as the protruding portions 36/37 including a lateral/vertical pairs, viewed from the front, of gently tapered faces 36a and 36b/37a and 37b that enable the spring base portion 33 of the spring 30 for the diffraction grating and the holder to be easily detachably mounted onto the holding unit 120X for the diffraction grating and the holder.

The spring base portion 33 is configured to contact the first holder 20, provided with the diffraction grating 10X and the second holder 26, that is aligned, when the first holder 20 provided with the diffraction grating 10X and the second holder 26 is accurately aligned with and installed in the accommodating chamber 129X of the holding unit 120X for the diffraction grating and the holder, as well as after the OPU 100X is assembled. The pair of elastic bending parts 31 and 32 in a substantially tongue-like shape, configured to generate the restoring elastic force against the first holder 20 provided with the diffraction grating 10X and the second holder 26, is provided extending from the spring base portion 33.

For example, a substantially flat plate-like metal raw material composing the spring 30 for the diffraction grating and the holder is folded back in a substantially inverted V-shape, viewed from the side, at folding portions 31b and 32b, thereby, providing the pair of elastic bending parts 31 and 32 in a substantially tongue-like shape extending substantially in the direction away from the spring base portion 33, for example. When the elastic bending parts 31 and 32 of the spring 30 for the diffraction grating and the holder including the spring base portion 33 and the elastic bending parts 31 and 32 are in a natural state, the substantially elliptic tip portions 31a/32a from bend portions 31c/32c, at which the elastic bending parts 31/32 are substantially gently bent to the tips are provided substantially in parallel to the spring base portion 33. The pair of elastic bending parts 31 and 32 in the substantially tongue-like shape is formed by being folded back with respect to the spring base portion 33, and the spring 30 for the diffraction grating and the holder is formed in a substantially reversed and inverted J-shape viewed from the side, for example. The spring base portion 33 contacts the diffraction grating 10X and the bend portions 31c/32c, at which the elastic bending parts 31 and 32 are substantially gently bent, contact the inside of the accommodating chamber 129 of the holding unit 120X for the diffraction grating and the holder.

In the mounting structure of the diffraction grating 10X, the spring 30 for the diffraction grating and the holder in an embodiment described above is used as the leaf spring 30.

The OPU 100X includes the mounting structure of the diffraction grating 10X.

If the mounting structure of the above described diffraction grating 10X is configured, the first holder 20 provided with the diffraction grating 10X and the second holder 26 is accurately position adjusted and mounted onto the holding unit 120X for the diffraction grating and the holder of the housing 110X using the spring 30 for the diffraction grating. Thus, the OPU 100 excellent in optical characteristics is configured.

When the first holder 20 provided with the diffraction grating 10X and the second holder 26 is aligned with and installed in the accommodating chamber 129X of the holding unit 120X for the diffraction grating and the holder of the housing 110X, the first holder 20 provided with the diffraction grating 10X and the second holder 26 is provided so as to be elastically held with accuracy in the accommodating chamber 129X of the holding unit 120X for the diffraction grating and the holder of the housing 110X, in a state where the attachment position is adjustable substantially in the left and right directions DLR and/or the up and down directions DDU and/or the rotational direction, by the restoring elastic force generated in the bent elastic bending parts 31 and 32 of the spring 30 for the diffraction grating and the holder mounted together therewith in the accommodating chamber 129X of the holding unit 120X for the diffraction grating and the holder of the housing 110X. The press-fitting fixing portions 36 and 37 for positioning and fixing to the holding unit 120X for the diffraction grating and the holder are provided on the spring base portion 33 composing the spring 30 for the diffraction grating and the holder, and the spring 30 for the diffraction grating and the holder is demountably pressed in to be fixed to the accommodating chamber 129X of the holding unit 120X for the diffraction grating and the holder. Thus, for example, when the attachment position of the fist holder 20, provided with the diffraction grating 10X and the second holder 26, mounted together with the spring 30 for the diffraction grating and the holder in the accommodating chamber 129X of the holding unit 120X for the diffraction grating and the holder of the housing 110X is adjusted substantially in the left and right directions DLR and/or the up and down directions DDU and/or the rotational direction, such a malfunction is avoided that the spring 30 for the diffraction grating and the holder is inadvertently displaced substantially in the left and right directions DLR and/or the up and down directions DDU and/or the rotational direction in the accommodating chamber 129X of the holding unit 120X for the diffraction grating and the holder of the housing 110X, resulting in inaccurate position adjustment of the first holder 20 provided with the diffraction grating 10X and the second holder 26 associated with such displacement, for example. Thus, the first holder 20 provided with the diffraction grating 10X and the second holder 26 is provided in such a manner to be elastically held with accuracy in the accommodating chamber 129X of the holding unit 120X for the diffraction grating and the holder of the housing 110X.

The pair of protruding portions 36 and 37 is provided protruding in a substantially trapezoidal shape on the left and the right side portions 33L and 33R, viewed from the front, of the spring base portion 33 of the spring 30 for the diffraction grating and the holder, thereby enabling the positioning substantially in the left and right directions DLR, i.e., lateral positioning, executed when the spring 30 for the diffraction grating and the holder is installed in the accommodating chamber 129X of the holding unit 120X for the diffraction grating and the holder of the housing 110X, and also thereby preventing lateral displacement of the spring 30 for the diffraction grating and the holder when the first holder 20 provided with the diffraction grating 10X and the second holder 26 is moved substantially in the left and right directions DLR from its initial attachment position by adjusting the position of a substantially central border line 16X, so-called substantially central dividing line 16X of the diffraction grating 10X. As a result, the contact position becomes always stabilized between the first holder 20 provided with the diffraction grating 10X and the second holder 26, and the spring 30 for the diffraction grating and the holder. Further, associated with this, in the mounting structure of the diffraction grating 10X, the initial performance is improved in stability and the phase shift of the diffraction grating 10X is improved even in the reliability evaluation, etc., in a heat shock test, etc.

As to the protruding portion shape of the protruding portions 36 and 37 of the spring 30 for the diffraction grating and the holder, considering mounting of the spring 30 for the diffraction grating and the holder and/or the first holder 20 provided with the diffraction grating 10X and the second holder 26 onto the holding unit 120 for the diffraction grating and the holder of the housing 110X and demounting thereof therefrom when repairing, the lateral and the vertical pairs, viewed from the front, of gently tapered faces 36a and 36b/37a and 37b are formed on the protruding portions 36/37 of the left and the right side portions 33L/33R, viewed from the front, of the spring base portion 33 composing the spring 30 for the diffraction grating and the holder, so that the protruding portions 36/37 are formed in a substantially tapered shape, thereby being able to easily demountably mount the spring 30 for the diffraction grating and the holder onto the holding unit 120X for the diffraction grating and the holder of the housing 110X.

The lateral and the vertical pairs, viewed from the front, of gently tapered faces 36a and 36b/37a and 37b are formed on the protruding portions 36/37 of the left and the right side portions 33L/33R, viewed from the front, of the spring base portion 33 composing the spring 30 for the diffraction grating and the holder, so that the protruding portions 36/37 in a substantially tapered shape, so-called tapered portions, for example, are provided on the left and the right side portions 33L/33R, viewed from the front, of the spring base portion 33 composing the spring 30 for the diffraction grating and the holder, which causes the metal spring 30 to dig into the holding unit 120X for the diffraction grating and the holder of the housing 110X made of resin, so-called plastic, when the spring 30 for the diffraction grating and the holder is attached to the holding unit 120X for the diffraction grating and the holder of the housing 110X, thereby expecting an effect of preventing misalignment of the spring 30 for the diffraction grating and the holder with respect to the holding unit 120X for the diffraction grating and the holder of the housing 110X.

The attachment position of the first holder 20 provided with the diffraction grating 10X and the second holder 26 is adjusted and the first holder 20 provided with the diffraction grating 10X and the second holder 26 is accurately installed in the accommodating chamber 129X of the holding unit 120X for the diffraction grating and the holder of the housing 110X, and thereafter, the holding unit 120X for the diffraction grating and the holder and/or the spring 30 for the diffraction grating and the holder are/is securely fixed to the inside of the accommodating chamber 129X of the holding unit 120X for the diffraction grating and the holder of the housing 110X using bonding member/adhesive 200, for example.

The spring 30 for the diffraction grating and the holder, and/or the first holder 20 provided with the diffraction grating 10X and the second holder 26 are/is detachably mounted onto the holding unit 120X for the diffraction grating and the holder of the housing 110X before application and fixation of the bonding member/adhesive 200. However, after the application and the fixation of the bonding member/adhesive 200, the spring 30 for the diffraction grating and the holder, and/or the first holder 20 provided with the diffraction grating 10X and the second holder 26 are/is undetachably mounted onto the holding unit 120X for the diffraction grating and the holder of the housing 110X.

The diffraction grating 10X will be described in detail. A diffraction face portion 10ax of the diffraction grating 10X is formed as one face portion 10ax supporting diffraction of a plurality of types of laser wavelength light beams, acting both as the diffraction face portion 10ax configured to split the first laser wavelength light beam into at least one first main beam and two first sub-beams and as the diffraction face portion 10ax configured to split the second laser wavelength light beam into at least one second main beam and two second sub-beams. The diffraction face portion 10ax of the diffraction grating 10X includes a repetitive periodic structure with minute projections/recesses. A back face portion 10bx on the back of the diffraction face portion 10ax composing the diffraction grating 10X is formed as a smooth face portion 10bx, for example, without the repetitive periodic structure with minute projections/recesses formed on the back face portion 10bx on the back of the diffraction face portion 10ax composing the diffraction grating 10X.

When the diffraction face portion 10ax of the diffraction grating 10X is formed as such, generation of unnecessary diffracted light beams on the diffraction grating 10X is suppressed and degradation in efficiency of the laser light beams is prevented, thereby configuring the OPU 100X capable of further reduction in price.

When the diffraction face portion 10ax of the diffraction grating 10X is formed as one face portion 10ax supporting diffraction of a plurality of types of laser wavelength light beams, acting both as the diffraction face portion 10ax configured to split the first laser wavelength light beam into at least the one first main beam and the two first sub-beams, and as the diffraction face portion 10ax configured to split the second laser wavelength light beam into at least one second main beam and two second sub-beams, it is avoided that the first main beam and the first sub-beams of the first laser wavelength light beam are unnecessarily diffracted, thereby degrading the light efficiency of the first main beam and the first sub-beams of the first laser wavelength light beam, and also avoided that the second laser wavelength light beam is unnecessarily diffracted, thereby degrading the light efficiency of the second laser wavelength light beam.

Since the diffraction face portion 10ax of the diffraction grating 10X is formed as one face portion 10ax supporting diffraction of a plurality of types of laser wavelength light beams acting both as the diffraction face portion 10ax configured to split the first laser wavelength light beam into at least one first main beam and two first sub-beams, and as the diffraction face portion 10ax configured to split the second laser wavelength light beam into at least one second main beam and two second sub-beams, the diffraction grating 10X is configured with reduced parts thereof to be worked on, reduced working processes therefor, etc. Since the parts to be worked on, the working processes, etc., of the diffraction grating 10X are reduced, the diffraction grating 10X is reduced in price. Associated with this, it becomes possible to configure the OPU 100X enables reduction in price.

The diffraction grating 10X is provided with phase shifting regions 11x and 14x each causing a phase shift of n radian in a part of the laser light beams emitted from the LD, similarly to the diffraction grating 10. The diffraction grating 10x is divided into at least four regions 11x to 14x, which are the first region 11x in a substantially rectangular shape, the second region 12x in a substantially linear shape adjacent to the first region 11x, third region 13x in a substantially linear shape adjacent to the second region 12x, and the fourth region 14x in a substantially rectangular shape adjacent to the third region 13x. The diffraction grating 10x is divided into a plurality of regions 11x to 14x. A predetermined periodic structure is configured in each of the regions 11x to 14x.

For the sake of clarity of phase states of the second region 12x and that of the third region 13x, the second and the third regions 12x and 13x are depicted each with some widths for convenience sake. In practice, the second and the third regions 12x and 13x of the diffraction grating 10X are in a thin linear shape with a width 10w of about 20 to 200 μm, for example. The periodic structure of each of the regions 11x to 14x composing the diffraction grating 10X is a repetitive periodic structure with minute projections/recesses. The diffraction grating 10X is a glass plate or a plastic plate having lateral and longitudinal dimensions of about 3 to 10 mm and a thickness of about 0.3 to 5 mm, for example.

The diffraction grating 10X divided into the plurality of regions 11x to 14x facilitates favorable error signal detection by the OPU 100X for the signal-surface portion Ma of the medium M. For example, it facilitates favorable tracking by the OPU 100X on the signal-surface portion Ma of the medium M. The diffraction grating 10X divided into the plurality of regions 11x to 14x is configured, thereby applying at least three independent condensed light spots onto the signal-surface portion Ma of the medium M. At least three condensed light spots are independently applied onto the signal-surface portion Ma of the medium M, which facilitates avoiding degradation in accuracy in detecting an error signal such as a tracking error signal during recording, reproducing, etc., of two or more types of media M whose track pitches are different from each other. Thus, the OPU 100X capable of easily performing tracking control can be provided.

The diffraction grating 10X is divided into an even number of regions 11x to 14x.

When the diffraction grating 10X is configured to be divided into an even number of regions 11x to 14x, the condensed light spots formed on the signal-surface portion Ma of the medium M are formed as accurate condensed light spots. For example, the diffraction grating 10X is divided by the border line 16x between the second region 12x and the third region 13x adjacent to the second region 12x of the diffraction grating 10X into at least two equal parts, i.e., an even number of parts, which are one region 18x including the first region 11x and the second region 12x adjacent to the first region 11x, and the other region 19x including the third region 13x and the fourth region 14x adjacent to the third region 13x, thereby facilitating irradiating, with the light beam to be applied to the diffraction grating 10X, one region 18x and the other region 19x of the diffraction grating 10X in a substantially equal manner when the diffraction grating 10X is mounted on the OPU 100X. It is facilitated to irradiate, with the light beam, one region 18x and the other region 19x of the diffraction grating 10X in a substantially equal manner, thereby facilitating accurate mounting of the diffraction grating 10X onto the OPU 100X. Thus, it is facilitated to form the accurate condensed light spots on the signal-surface portion Ma of the medium M. Associated with this, accuracy is improved in detecting an error signal such as a tracking error signal during recording, reproducing, etc., of two or more types of media M whose track pitches are different. It is facilitated to accurately execute the tracking of the OPU 100X for the signal-surface portion Ma of the medium M.

The diffraction grating 10X is divided into at least the four regions 11x to 14x: the first region 11x; the second region 12x, which is adjacent to the first region 11x and includes a periodic structure different from that of the first region 11x; the third region 13x, which is adjacent to the second region 12x and includes a periodic structure different from that of the second region 12x; and the fourth region 14x, which is adjacent to the third region 13x and includes a periodic structure different from that of the third region 13x. The diffraction grating 10X is configured as a so-called quadrisected in-line grating.

If the diffraction grating 10X divided into the plurality of regions 11x to 14x is mounted on the OPU 100X, the error signal detection is favorably executed by the OPU 100X for the signal-surface portion Ma of the medium M. For example, the tracking is favorably executed of the OPU 100X for the signal-surface portion Ma of the medium M. Since the diffraction grating 10X is configured to be divided into the four regions 11x to 14x, the signal-surface portion Ma of the medium M is irradiated with at least three independent condensed light spots. Since at least three condensed light spots are each independently applied to the signal-surface portion Ma of the medium M, it is avoided to degrade the accuracy in detection of an error signal such as a tracking error signal associated with displacement of the OBL 131 (FIG. 10) when data is recorded into or reproduced from two or more types of media M having different track pitches, for example. Thus, it is possible to provide the OPU 100X whose tracking control is facilitated.

The diffraction grating 10X includes: the one region 18 in a substantially rectangular shape including the first region 11x and the second region 12x adjacent to the first region 11x; and the other region 19 also in a substantially rectangular shape including the third region 13x and the fourth region 14x adjacent to the third region 13x. A width 11w of the first region 11x and a width 14w of the fourth region 14x of the diffraction grating 10X are set to be substantially equal widths. A width 12w of the second region 12x and a width 13w of the third region 13x of the diffraction grating 10X are set to be substantially equal widths. The diffraction grating 10X is divided into two equal parts of the one region 18x and the other region 19x composing the diffraction grating 10X. The diffraction grating 10X is divided into an even number of parts, by the border line 16x between the second region 12x and the third region 13x adjacent to the second region 12x of the diffraction grating 10X. The diffraction grating 10X is divided into an even number of parts.

As a result, each of the condensed light spots formed on the signal-surface portion Ma of the medium M is formed as accurate condensed light spot. The diffraction grating 10X is divided into the two equal parts, which are the one region 18x including the first region 11x and the second region 12x adjacent to the first region 11x; and the other region 19x including the third region 13x and the fourth region 14x adjacent to the third region 13x, by the border line 16x between the second region 12x and the third region 13x adjacent to the second region 12x of the diffraction grating 10X that is divided into an even number of parts, thereby easily adjusting the optical axis of the laser light beam emitted from the LD and applied to the diffraction grating 10X, using a camera for adjusting the optical axis, etc., not depicted, for example, when the first holder 20 including the diffraction grating 10X and the second holder 26 is installed in the housing 110X of the OPU 100X. The laser light beam emitted from the LD, applied to the diffraction grating 10X, and, thereafter having passed through the OBL 133 is observable with a camera for adjusting an optical axis, for example.

Since the quadrisected diffraction grating 10X is provided with the border line 16x configured to divide the diffraction grating 10X at its substantial center into two equal parts and configure the one region 18x and the other region 19x in a substantially rectangular shape, it is facilitated that the laser light beam is applied, in such a manner as to be divided into substantially equal two parts, to the one region 18X and the other region 19x in a substantially rectangular shape composing the diffraction grating 10X when the optical axis of the laser light beam is adjusted using a camera for adjusting an optical axis or the like.

It is facilitated that the laser light beam is applied, in such a manner as to be divided into substantially equal two parts, to the one region 18x and the other region 19x in a substantially rectangular shape composing the diffraction grating 10X, thereby facilitating that the first holder 20 provided with the diffraction grating 10X and the second holder 26 is installed in the housing 110X of the OPU 100X with the positioning adjustment thereof being accurately made thereto. Thus, it is facilitated to form the condensed light spots accurately on the signal-surface portion Ma of the medium M. Associated with this, it is facilitated to accurately execute the tracking of the OPU 100X for the signal-surface portion Ma of the medium M.

The diffraction grating 10X in a substantially rectangular plate-like shape is installed in a accommodating chamber 24 in a substantially rectangular box-like shape of the first holder 20 in a substantially rectangular box shape, and then the ultraviolet radiation curing adhesive 200, classified as a type of electron radiation curing adhesive 200, is applied to the inside of a pair of substantially semicircular recess-like adhesive accommodating chambers 24a and 24b that are connected to the accommodating chamber 24 for the diffraction grating of the first holder 20, and thereafter ultraviolet light classified as a type of electron beam is applied to the ultraviolet radiation curing adhesive 200 classified as a type of electron radiation curing adhesive 200, thereby curing the adhesive 200. As a result, the diffraction grating 10X is adhered and fixed to the first holder 20.

A substantially cylinder-like fitting unit 25 of the first holder 20 in a substantially rectangular box shape provided with the diffraction grating 10X in a substantially rectangular plate shape is fitted into a substantially hole-like fitting unit 27 of the second holder 26 in a substantially rectangular plate shape, thereby mounting the second holder 26 onto the first holder 20 provided with the diffraction grating 10X. Thus, the first holder 20 provided with the diffraction grating 10X is rotatably mounted on the second holder 26.

Then, the first holder 20 provided with the second holder 26 and the diffraction grating 10X, and the spring 30 for the diffraction grating and the holder are installed in the accommodating chamber 129X of the holding unit 120X for the diffraction grating and the holder of the housing 110X.

After adjusting the attachment position of the first holder 20 provided with the second holder 26 and the diffraction grating 10X, the ultraviolet radiation curing adhesive 200 classified as a type of electron radiation curing adhesive 200 is applied to: a pair of substantially inclined left and right lower end face portions 21 and 22 of the first holder 20; a pair of left and right end face portions 121X and 122X of the holding unit 120X for the diffraction grating and the holder; and lower end substantially central portions 23 and 28 of the first and the second holders 20 and 26. Thereafter, the ultraviolet radiation curing adhesive 200 classified as a type of electron radiation curing adhesive is applied with ultraviolet light classified as a type of electron beam, thereby curing the adhesive 200. As a result, the first holder 20, provided with the diffraction grating 10X and the second holder 26, and the spring 30 for the diffraction grating and the holder are accurately and elastically held in and fixed to the inside of the accommodating chamber 129X of the holding unit 120X for the diffraction grating and the holder of the housing 110X.

The optical disc apparatus is the optical disc apparatus including the OPU 100X for notebook PC, for example. The optical disc apparatus for notebook PC including the OPU 100X for notebook PC, etc., will not be described in detail.

Those common to first and second embodiments of the present invention will collectively described as follows. The diffraction gratings 10 and 10X, the holders 20 and 26, the OBLs 131, 132 and 133, etc., are formed based on injection molding method using a thermal-plastic heat-resistant synthetic resin material that is usable for injection molding and that is transparent or translucent, or colored depending on its use, etc., for example. More specifically, the diffraction gratings 10 and 10X, the holders 20 and 26, the OBLs 131, 132 and 133, etc., are formed based on injection molding method, using a composite mainly including an acrylic or methacrylic resin that is excellent in weather resistance, mirror smoothness, accuracy etc., and that is highly transparent, for example. The formal name of a methacrylic resin is "polymethylmethacrylate" and polymethylmethacrylate is abbreviated as "PMMA", for example. A methacrylic resin may also be referred to as "acrylic resin". The diffraction gratings 10 and 10X, the holders 20 and 26, the OBLs 131, 132 and 133, etc., are formed using a composite mainly including a polycarbonate (PC)-based resin excellent in workability, etc., and facilitating reduction in price, for example.

For example, the diffraction gratings 10 and 10X, the holders 20 and 26, the OBLs 131, 132 and 133, etc., are formed using a synthetic resin material, thereby facilitating reduction in weight for each of the diffraction gratings 10 and 10X, the holders 20 and 26, the OBLs 131, 132 and 133, etc. The diffraction gratings 10 and 10X, the holders 20 and 26, the OBLs 131, 132 and 133, etc., made of synthetic resin are efficiently mass produced based on injection molding method. The mass production of the diffraction gratings 10 and 10X, the holders 20 and 26, the OBLs 131, 132 and 133, etc., is enabled, thereby facilitating reduction in the prices of the diffraction gratings 10 and 10X, the holders 20 and 26, the OBLs 131, 132 and 133, etc.

For example, the synthetic polymer usable for injection molding and having thermoplastic properties can be acrylonitrile butadiene styrene (ABS), polybutylene terephthalate (PBT), poly amide (PA), poly propylene (PP), polyoxymethylene (POM), polycarbonate (PC), PMMA, liquid crystal polymer (LCP), PAS such as PPS, and a ketone-based resin such as poly ether ether ketone (PEEK (registered trademark)), polyaryletherketone (PEAK). The holders 20 and 26, etc., are formed using at least one type of resin composite of resin composites selected from a group including ABS, PBT, PP, POM, PC, PMMA, LCP, PPS, PAS, PEEK, and PEAK, for example.

The OPUs 100 and 100X are configured to be mounted on the optical disc apparatus 1, incorporated in a computer, an audio/video apparatus, a gaming machine, and an on-vehicle apparatus (all not depicted), for example. The OPU 100 or 100X, or the optical disc apparatus including the OPU 100 or 100X are capable of being mounted on: a computer such as a notebook personal computer (PC), a laptop PC, a desktop PC, and an on-vehicle computer; a gaming machine such as a computer gaming machine; or an audio and/or video apparatus such as a CD player/a CD recorder, a DVD player/a DVD recorder, and a "Blu-ray/Blu-ray Disc" player/a "Blu-ray/Blu-ray Disc" recorder, all not depicted, for example. The OPUs 100 and 100X are capable of supporting a plurality of types of discs such as a "CD"-based disc, a "DVD"-based disc, an "HD DVD"-based disc, a "CBHD"-based disc, and a "Blu-ray/Blu-ray Disc"-based disc. The OPUs 100 and 100X are capable of supporting one optical disc including a signal-surface portion having a plurality of layers. The OPUs 100 and 100X are capable of being installed in a computer, an audio and/or video apparatus, a gaming machine, an on-vehicle apparatus, etc. (all not depicted), supporting various types of optical disc such as a "CD", a "DVD", an "HD DVD", a "CBHD" and a "Blu-ray/Blu-ray Disc".

The above embodiments of the present invention are simply for facilitating the understanding of the present invention and are not in any way to be construed as limiting the present invention. The present invention may variously be changed or altered without departing from its spirit and encompass equivalents thereof.

Figure 6:
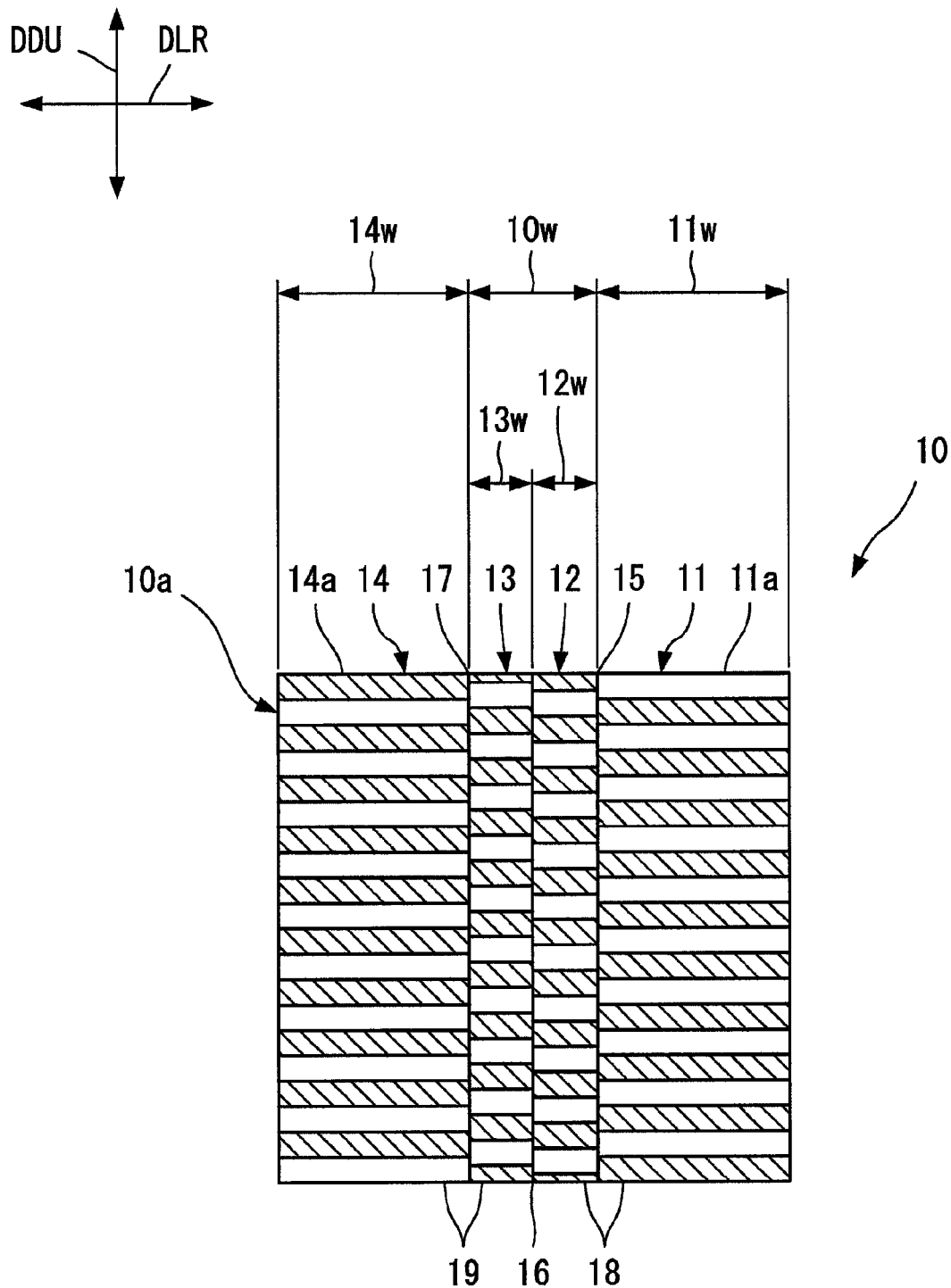
FIG. 6 is a plan view of an optical element configuring a mounting structure of an optical element according to a first embodiment of the present invention.

For example, the diffraction grating 10 may also be used that has: the repetitive periodic structure with minute projections/recesses formed on the diffraction face portion 10a of the diffraction grating 10 depicted in FIG. 6; and a repetitive periodic structure with minute projections/recesses formed also on the back face portion on the opposite side of the diffraction face portion 10a composing the diffraction grating 10. Instead of the quadrisected-type diffraction gratings 10 and 10X each including the four regions 11 to 14 and 11x to 14x, for example: a simplified-type diffraction grating (not depicted) may also be used including a simplified-type region in another form; a bisected-type diffraction grating (not depicted) may also be used including two regions in another form; a trisected-type diffraction grating (not depicted) may also be used including three regions in another form; and a quadrisected-type diffraction grating (not depicted) may also be used including four regions in another form. As such, diffraction gratings of double-sided diffraction-face type, simplified type, and multi-sectioned types each including a plurality of regions may be used.

Figure 11:
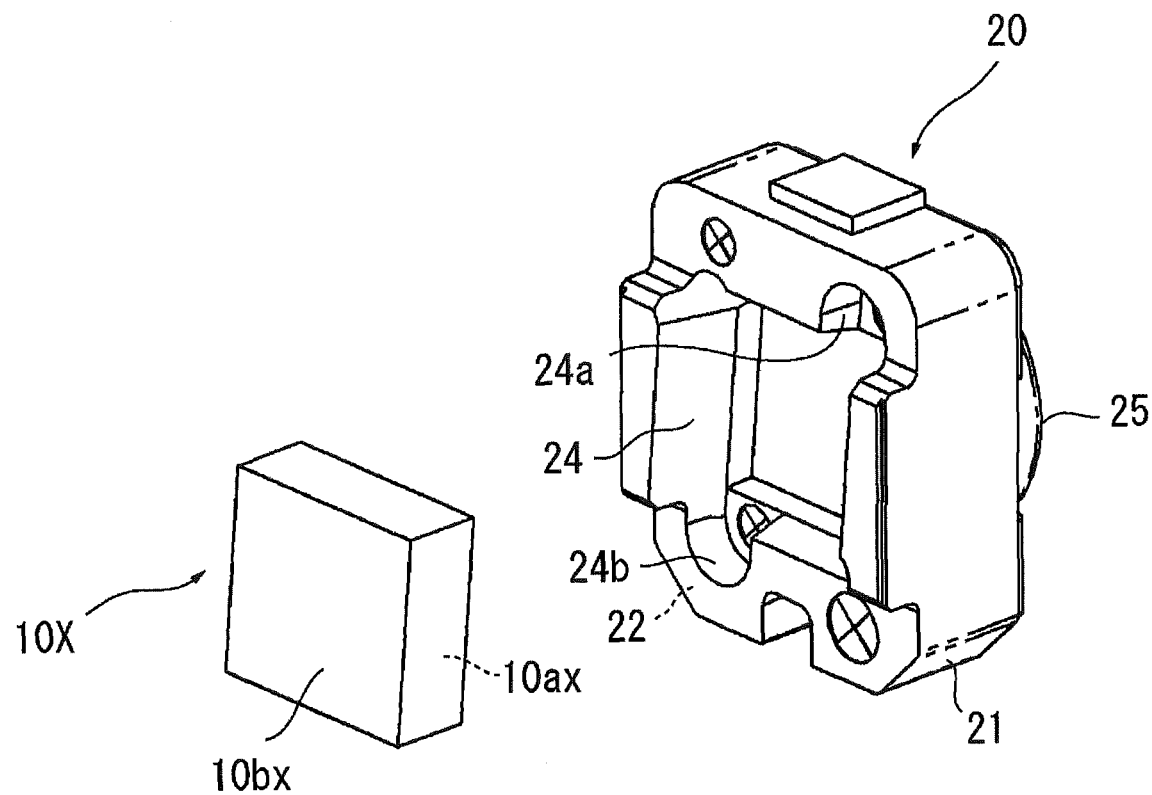
FIG. 11 is a perspective view of an optical element and a holding member configuring a mounting structure of an optical element according to a second embodiment of the present invention.
Figure 12:
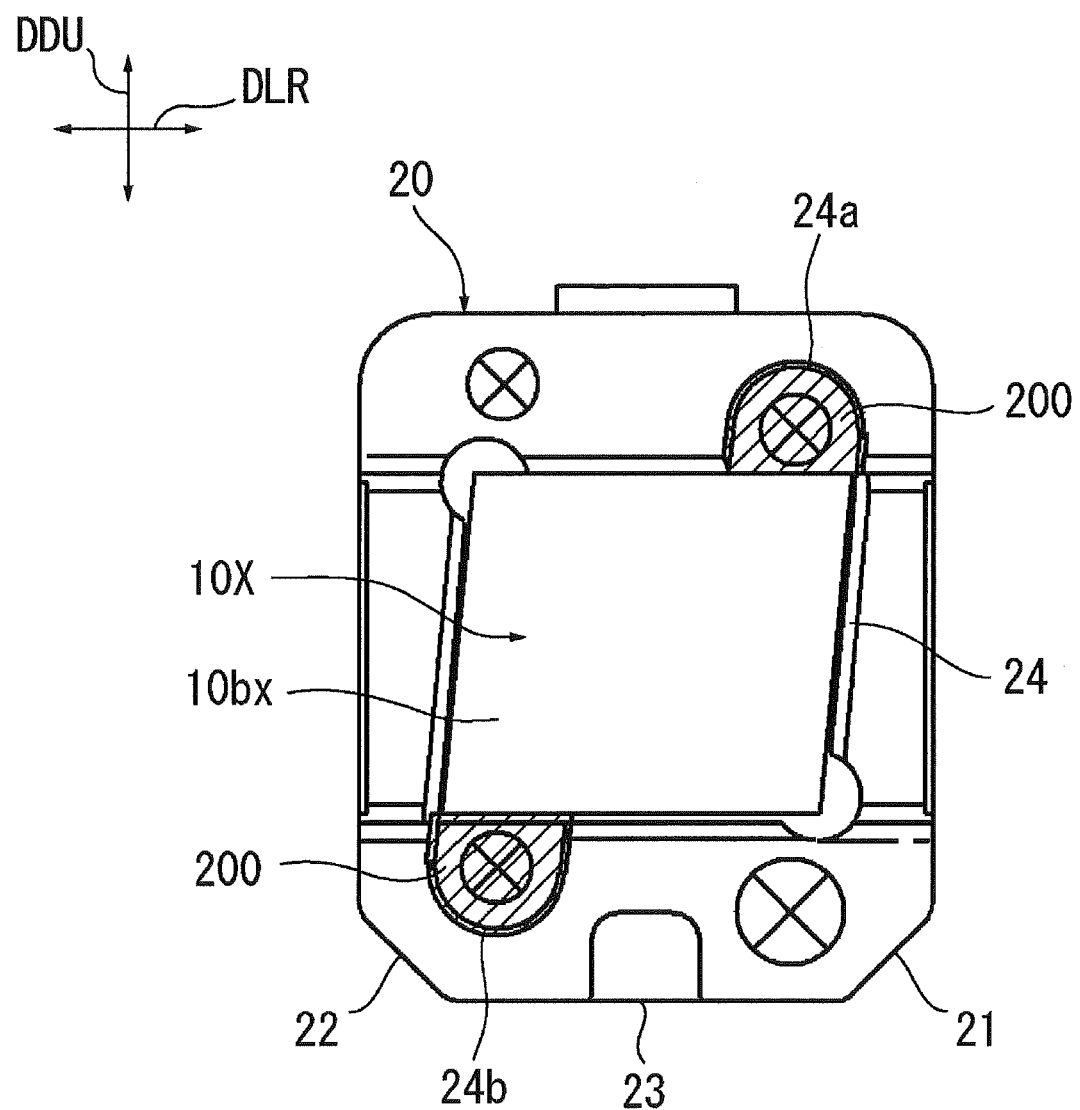
FIG. 12 is an explanatory view of an optical element and a holding member configuring a mounting structure of an optical element.

For example, the diffraction grating 10X may also be used that has: the repetitive periodic structure with minute projections/recesses formed on the diffraction face portion 10ax of the diffraction grating 10X depicted in FIGS. 11 to 13; and a repetitive periodic structure with minute projections/recesses also formed on the back face portion 10bx on the opposite side of the diffraction face portion 10ax composing the diffraction grating 10X. Instead of the quadrisected-type diffraction gratings 10X including the four regions 11x to 14x: a simplified-type diffraction grating (not depicted) may also be used including a simplified-type region in another form; a bisected-type diffraction grating (not depicted) may also be used including two regions in another form; a trisected-type diffraction grating (not depicted) may also be used including three regions in another form; and a quadrisected-type diffraction grating (not depicted) may also be used including four regions in another form, for example. As such, any of the diffraction gratings of a double-sided-diffraction-face type, a simplified type, and a multi-sectioned types each including a plurality of regions may be used.

For example, the holding members such as the holder including an optical element unit such as a resin diffraction grating unit may be integrally formed, by integrally forming a resin diffraction grating unit with the resin first holder 20 depicted in FIGS. 11 to 14 based on injection molding. In this case, in place of the diffraction grating 10X, another optical element such as a half-wave plate in a substantially rectangular plate shape is mounted on the holding member such as the holder including an optical element unit such as the resin diffraction grating unit, for example.

Similarly to first and second embodiments of the present invention: the first laser light beam may be a red laser light beam having a wavelength of about 660 nm (first wavelength) compatible with "DVD" standard; and the second laser light beam may be a blue-violet laser light beam having a wavelength of about 405 nm (second wavelength) compatible with "HD DVD", "CBHD", or "Blu-ray/Blu-ray Disc" standard, etc. In this case, the diffraction gratings 10 and 10X each include only a diffraction grating member having a grating interval corresponding to the wavelength compatible with "HD DVD", "CBHD", or "Blu-ray/Blu-ray Disc" standard, etc., for example.

According to an embodiment of the present invention, when the optical element is mounted on the holding unit, the optical element is mounted on the holding unit using the elastic member mounted together therewith to the holding unit. Since the elastic member is pressed into the holding unit, when adjusting the position of the optical element mounted together with the elastic member to the holding unit, for example, it is avoided that the elastic member is inadvertently displaced, resulting in inaccurate position adjustment of the optical element, for example, associated with such displacement. Thus, it is possible to accurately mount the optical element on the holding unit.

According to an embodiment of the present invention, when the optical element is aligned with and mounted on the holding unit, the optical element is mounted on the holding unit using the elastic member provided in the holding unit. Since the press-fitting fixing portion for positioning and fixing to the holding unit is provided in the elastic member base portion, when adjusting the mounting position of the optical element mounted together with the elastic member to the holding unit, for example, it is avoided that the elastic member is inadvertently shifted, resulting in inaccurate position adjustment of the optical element, for example, associated with such displacement. Thus, it is possible to accurately mount the optical element on the holding unit.

According to an embodiment of the present invention, the protruding portions are provided on the left and the right side portions, viewed from the front, of the elastic member base portion of the elastic member, thereby enabling the lateral positioning when the elastic member is mounted onto the holding unit, and also preventing lateral displacement of the elastic member when the optical element is moved in the left and right directions from its initial mounting position. As a result, the contact position between the optical element and the elastic member is able to be always stabilized. Associated with this, stability, reliability, etc., of initial performance can be improved.

According to an embodiment of the present invention, considering mounting and demounting of the elastic member and/or the diffraction grating onto/from the holding unit for mounting and repairing, the inclined face portions are formed on the press-fitting fixing portions of the left and the right sides, viewed from the front, of a spring base portion composing the elastic member, thereby enabling easy detachable mounting of the elastic member to the holding unit.

According to an embodiment of the present invention, the inclined face portions are formed on the press-fitting fixing portions of the left and the right sides, viewed from the front, of the spring base portion composing the elastic member and the press-fitting fixing portions in a substantially tapered shape, for example, are disposed on the left and the right sides, viewed from the front, of the spring base portion. Thus, the metal spring digs into the resin holding unit when the elastic member is mounted onto the holding unit, thereby being able to expect an effect of preventing misalignment of the elastic member with respect to the holding unit.

According to an embodiment of the present invention, the optical element is mounted onto the holding unit using the elastic member in an accurately position-adjusted manner. Thus, the pickup apparatus excellent in optical characteristics is able to be configured.

INDUSTRIAL APPLICABILITY

The present invention is applicable to: a pickup apparatus and a disc apparatus capable of: reproducing data, information, a signal, etc., recorded in various types of media such as various types of optical discs that can be "CD (Compact Disc)" (trademark), "DVD (Digital Versatile Disc)" (registered trademark), "HD DVD (High Definition DVD)" (registered trademark), "CBHD (Chinese Blue High-Definition)" (for example, former name of "CH-DVD"), and "Blu-ray or Blu-ray Disc" (registered trademark), for example; recording data, information, a signal, etc., in various types of media such as various types of writable or re-writable optical discs; and erasing data, information, a signal, etc., recorded in the various types of media such as the various types of writable or re-writable optical disc, and the present invention is also applicable to an elastic member and a mounting structure of an optical element that are provided in the above apparatuses.

DESCRIPTION OF NUMERALS 10, 10X diffraction grating (optical element)
30 spring (elastic member)
31, 32 abutting force generating unit (bending part)
33 spring base portion (elastic member base portion)
33L, 33R side portion
36, 37 protruding portion (press-fitting fixing portion)
36a, 36b, 37a, 37b tapered face (inclined face portion)
100, 100X OPU (pickup apparatus)
120 holder (holding unit)
120X holding unit

What is claimed is:
1. A mounting structure of an optical element, comprising:
an optical element;
an elastic member usable when the optical element is mounted; and
a holding unit configured to be mounted with the optical element and the elastic member,
the elastic member configured to be pressed into the holding unit, the holding unit configured to be mounted with the optical element by use of the elastic member;
the optical element is formed in such a fashion that the optical element is light-transmittable and has a substantially-rectangular plate-like shape viewed from a front, and
the elastic member is formed in such a fashion that the elastic member is light-transmittable and has a substantially-concave shape viewed from the front, corresponding to the optical element.
2. The mounting structure of the optical element of claim 1, wherein
the holding unit is formed by use of resin, and
the elastic member is formed by use of metal.
3. The mounting structure of the optical element of claim 1, wherein
the optical element includes a diffraction grating configured to split an incident light beam into a plurality of light beams.
4. The mounting structure of the optical element of claim 1, wherein
the elastic member usable when mounting the optical element onto the holding unit while aligning the optical element with the holding unit, and
an elastic member base portion includes a press-fitting fixing portion through which positioning and fixing to the holding unit is performed.
5. The elastic member of claim 4, wherein
the elastic member base portion is formed in a substantially plate shape, and wherein
the press-fitting fixing portion is a protruding portion protruding from each of left and right side portions viewed from a front of the elastic member base portion.
6. The elastic member of claim 4, wherein
the press-fitting fixing portion includes an inclined face portion configured to enable the elastic member base portion to be detachably mounted onto the holding unit.
7. The elastic member of claim 4, wherein
an abutting force generating unit is provided extending from the elastic member base portion, the abutting force generating unit configured to generate restoring elastic force against the optical element and the holding unit.
8. The elastic member of claim 7, wherein
the abutting force generating unit is folded back with respect to the elastic member base portion.
9. A pickup apparatus including the mounting structure of the optical element of claim 1.

* * * * *